US009591008B2

(12) United States Patent
Shulman et al.

(10) Patent No.: US 9,591,008 B2
(45) Date of Patent: Mar. 7, 2017

(54) DATA ACCESS VERIFICATION FOR ENTERPRISE RESOURCES

(71) Applicant: Imperva, Inc., Redwood Shores, CA (US)

(72) Inventors: Amichai Shulman, Tel Aviv (IL); Sagie Dulce, Hod HaSharon (IL)

(73) Assignee: IMPERVA, INC., Redwood City, CA (US)

( * ) Notice: Subject to any disclaimer, the term of this patent is extended or adjusted under 35 U.S.C. 154(b) by 63 days.

(21) Appl. No.: 14/688,914

(22) Filed: Apr. 16, 2015

(65) Prior Publication Data

US 2016/0261616 A1 Sep. 8, 2016

Related U.S. Application Data

(60) Provisional application No. 62/129,735, filed on Mar. 6, 2015.

(51) Int. Cl.
*G06F 21/30* (2013.01)
*H04L 29/06* (2006.01)
*G06F 21/55* (2013.01)

(52) U.S. Cl.
CPC ........ *H04L 63/1416* (2013.01); *G06F 21/554* (2013.01); *H04L 63/1441* (2013.01); *H04L 63/18* (2013.01); *G06F 2221/034* (2013.01)

(58) Field of Classification Search
USPC ............................. 726/4, 22, 23, 25; 713/182
See application file for complete search history.

(56) References Cited

U.S. PATENT DOCUMENTS

| 8,880,893 | B2* | 11/2014 | Moghe | G06F 21/316 709/223 |
| 2005/0097364 | A1* | 5/2005 | Edeki | G06F 21/31 726/4 |
| 2005/0183143 | A1* | 8/2005 | Anderholm | G06F 11/32 726/22 |
| 2012/0198556 | A1* | 8/2012 | Patel | G06F 11/3051 726/25 |
| 2013/0073473 | A1* | 3/2013 | Heath | G06Q 30/02 705/319 |
| 2016/0065594 | A1* | 3/2016 | Srivastava | H04L 63/1408 726/23 |

* cited by examiner

*Primary Examiner* — Sayed Beheshti Shirazi
(74) *Attorney, Agent, or Firm* — Nicholson De Vos Webster & Elliott, LLP

(57) ABSTRACT

According to one embodiment, a method in a computing device for responding to a determination that a verification with a user is desired responsive to detection of activity indicative of a possible insider threat is described. The method includes selecting a target role and a target user for the verification based on an activity context and an enterprise context repository, the selecting including selecting the target role from a plurality of target roles based on the activity context and optionally the enterprise context repository and selecting a target user in the selected target role based on the enterprise context repository. The method further includes causing a verification request to be sent to the selected target user; and generating an alert when a verification result indicates that the activity is indicative of the possible insider threat.

30 Claims, 23 Drawing Sheets

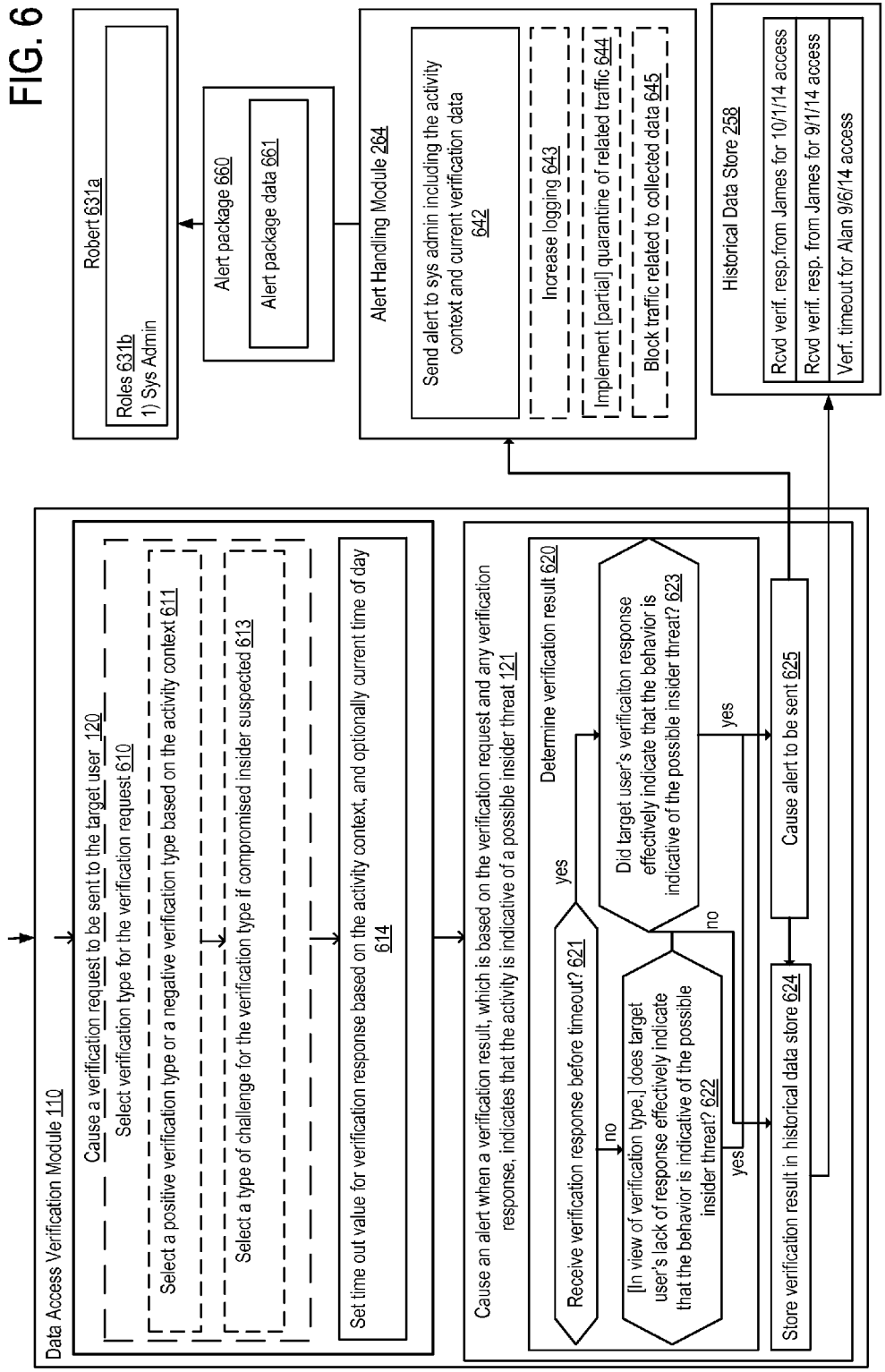

DATA ACCESS VERIFICATION FOR ENTERPRISE RESOURCES

CROSS-REFERENCE TO RELATED APPLICATIONS

This application claims the benefit of U.S. Provisional Application No. 62/129,735, filed Mar. 6, 2015, which is hereby incorporated by reference.

FIELD

Embodiments of the invention relate to the field of networking; and more specifically, to data access verification for enterprise resources.

BACKGROUND

In a basic form, an enterprise comprises users on client end stations (e.g., a computer, mobile device, or tablet) accessing enterprise resources. These enterprise resources may be presented to the user in the form of one or more enterprise applications coupled to enterprise data. For example, one example of an enterprise application may be a customer relationship management (CRM) application used by the enterprise to track interactions with customers of that enterprise. The enterprise data for the CRM application, likely in the form of a database, would include the stored customer interactions and other data necessary for the application to run.

In some cases, access requests to these enterprise resources may be suspicious. A suspicious access may turn out to be an attack (e.g., an intrusion) into the network. Such an attack may be a result of an attacker taking advantage of a compromised insider, or may be a result of a malicious insider or a negligent insider (the latter two being authorized users of the enterprise). In the case of a compromised insider, an attacker from outside the enterprise (e.g., an unknown attacker) may: 1) access information (e.g., credentials) from a compromised client end station phishing email, social engineering etc., that can be used from the attacker's client end station to access enterprise resources (e.g. gaining access to the enterprise network via a virtual private network (VPN) connection); 2) take control of a compromised end station within the enterprise network to access enterprise resources; 3) or install software on the compromised end station to access enterprise resources. A malicious insider or negligent insider may be able to directly use a client end station within the enterprise to access the enterprise resources. Since each of three above types of attacks involves an insider, the detection of activity indicative of one of the above types of attacks is referred to as the detection of an "insider threat."

These attacks can lead to great losses and damages to the enterprise if they are not detected and managed. As more companies evolve highly connected enterprise network infrastructures, the danger of unauthorized data access and theft increases, and the fallout from such access is grave. However, current technologies do not adequately allow the enterprise to manage and determine the risk from suspicious accesses, and so in many cases suspicious activity on the network is unchecked and not properly monitored. Thus, there is a desire to have an improved method of monitoring and managing suspicious data access activity against enterprise resources.

BRIEF DESCRIPTION OF THE DRAWINGS

The invention may best be understood by referring to the following description and accompanying drawings that are used to illustrate embodiments of the invention. In the drawings:

FIG. 6 is a block and flow diagram illustrating various verification and alert methods according to an embodiment of the invention;

DESCRIPTION OF EMBODIMENTS

Figure 1:
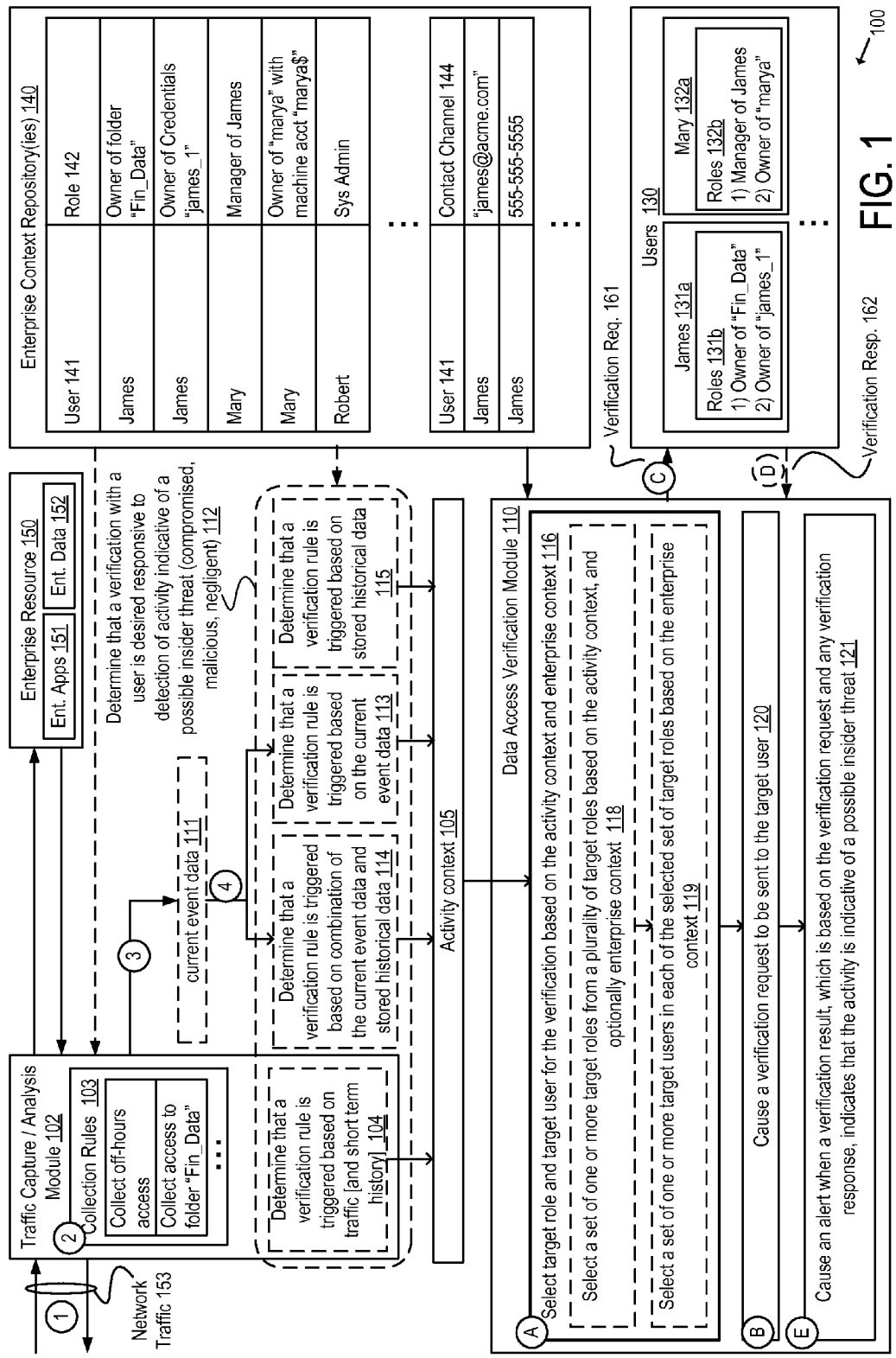
FIG. 1 is a block diagram illustrating a system 100 for data access verification for enterprise resources according to certain embodiments of the invention.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

In an enterprise (e.g., a business or organization), users are constantly accessing enterprise resources however not every activity on the network may be legitimate. Embodiments of the invention provide for methods, systems, and apparatuses for responding to a determination that a verification with a user is desired responsive to detection of activity indicative of a possible insider threat. More specifically, embodiments of the invention respond to such a determination by selecting the proper target role(s) and target user(s) in those target role(s) to contact for verification, wherein the selected target role(s) and the selected target user(s) in those selected target role(s) are intended to be the user(s) of the enterprise having the requisite knowledge to confirm whether or not the activity is indicative of the possible insider threat. This is an improvement over: 1) a system without verification because the consequence of having no verification method is that the security of the system is left vulnerable; 2) a system where the verifications are always towards the enterprise network admin(s) because they often lack the knowledge to confirm whether or not the activity is indicative of the possible insider threat, and thus ignore or routinely respond in a manner that indicates there is not an insider threat (this may even create a false sense of security); and 3) a system where the verifications are always toward the owner of the user credentials being used for the access because this does not cover all situations and because it does not help relative to at least a malicious insider.

FIG. 1 is a block diagram illustrating a system 100 for data access verification for enterprise resources according to certain embodiments of the invention.

The system in FIG. 1 may determine (112) that a verification with one or more users is desired responsive to detection of activity indicative of a possible insider threat (e.g., a compromised insider, malicious insider, or negligent insider). While embodiments are described in which the determination 112 may be achieved as depicted in dashed blocks 104, 113, 114, and 115, alternative embodiments may use more, less, or different approaches (hence the use of dashed blocks for each). The determination 112 is illustrated as a dashed rounded corner block surrounding blocks 104, 113, 114, and 115 because these blocks may be performed by the same or different software modules running on the same or different hardware, but any one of which may make the determination 112 (hence the use of dashed blocks for each).

In FIG. 1, the circled numbers are used to denote one exemplary order/sequence of the transactions in FIG. 1. At circle 1, network traffic 153 is sent between one or more client end stations (not shown) towards enterprise resources 150. Client end stations may be any computing device users may capable of accessing enterprise resources. Enterprise resources 150 include enterprise applications 151 and enterprise data 152, be they in the enterprise network, in the cloud, or provided as software as a service (SAAS) (e.g., internal and/or external web applications, databases in database servers, SharePoint servers, files in file servers, data in windows domain servers; however, the invention may also be utilized for detecting unauthorized attempts to access print servers, mail servers, gaming servers, application servers, or any other type of server providing access to data or services. For example, enterprise applications may include customer relationship management software, human resources software, web applications, and cloud applications; while enterprise data may include the database, flat files, or other data used by the enterprise applications. For example, an enterprise domain server (the application) which manages login accounts on computers across the enterprise's network may need a directory services store (the data) in order to record user login and password information. Further details regarding the enterprise resources 150 and client end stations will be described with reference to FIG. 3A.

In system 100, a traffic capture/analysis module (TCAM) 102 is communicatively coupled between the client end stations and the enterprise resources 150 to capture and analyze network traffic being sent between them. TCAM 102 may be implemented in hardware and/or in software. While in some embodiments the TCAM 102 is inline (e.g., a transparent bridge or layer 3 router, be it physical or virtualized), in alternative embodiments the TCAM 102 may be implemented differently (e.g., a transparent proxy, a reverse proxy, a non-inline sniffer).

The capturing of the network traffic by the TCAM 102 may include: 1) capturing the packets (e.g., at the network layer (aka layer 3)) for analysis; and/or 2) capturing the packets and reconstructing therefrom higher layer protocol messages and/or events—such as at the application layer (aka Open Systems Interconnection (OSI) model Layer 7; ISO/IEC 7498-1) (referred to here as "application messages" or "application events")—for analysis. Examples of application layer protocols include Oracle Net8™, Microsoft SQL Server™ Tabular Data Stream (TDS), Sybase TDS, OpenGroup Distributed Relational Database Architecture (DRDA) based protocols, and similar application level protocols. Additional examples of application level protocols include HTTP for web application communication (and encrypted HTTP (HTTPS)); File Transfer Protocol (FTP) for file transmission; Internet Message Access Protocol (IMAP) and Post Office Protocol (POP) for email; Simple Mail Transfer Protocol (SMTP) for transmitting email; Internet Relay Chat (IRC) for real-time Internet text messaging; Session Initiation Protocol (SIP) for voice and video calling; and protocols for remote access to files, such as Network File System (NFS), WebNFS, Server Message Block (SMB)/Common Internet File System (CIFS), SAMBA, File Transfer Protocol (FTP), Web Distributed Authoring and Versioning (WebDAV), Apple Filing Protocol (AFP), Remote File System (RFS), and that provided by Microsoft Sharepoint™ (which is a web application platform providing content management and document and file management). TCAM 102 analyzes the result of capturing the network traffic 153 sent between the client end stations and the enterprise resources 150 (while in one embodiment the TCAM 102 analyzes requests sent by the client end stations toward the enterprise resources 150 and the responses, in alternative embodiments the TCAM 102 looks at only requests or responses). As noted previously, some of the network traffic 153 may reflect activity indicative of a possible insider threat. In order to analyze the network traffic 153, TCAM 102 is configured with one or more collection rules 103 (which specify criteria against which the result of the capturing (e.g., packets and/or application messages/events) are compared). These collection rules may be configured by an administrator and/or automatically in response to analyzing traffic patterns over a period of time (e.g., by the TCAM 102 itself, by a secure server to which the TCAM 102 (and possibly other TCAMs) report, etc.). These collection rules 103 cause the TCAM 102 to report on network traffic 153 matching the criteria indicated by the collection rules 103. For example, a collection rule may indicate to report on all network traffic that occurs off-hours (i.e., between a certain time range). As another example, a collection rule may indicate to report on all network traffic pertaining to access to a particular set of files (e.g., financial data). An implementation of such a collection rule may define a packet and/or application layer protocol to scan or search for, particular packet header data or other information in the packets and/or application messages/events to search for, when to search for these packets and/or application messages/events, how to log the information collected (e.g., log a timestamp, username, files accessed), etc. When network traffic matching the scanning or search criteria in a collection rule are detected in the network traffic 153, the TCAM 102 may then collect information regarding that network traffic according to what is specified in the triggered collection rule. Additional exemplary details regarding the TCAM 102 and exemplary collection rules are described later herein.

At circle 2, a portion of the network traffic 153 triggers a collection rule 103, and the TCAM 102 may report on that network traffic as current event data 111 at circle 3. Current event data 111 may include the information collected from the network traffic 153 and/or information known about that portion of the network traffic (e.g., a timestamp of when the information was collected, username of the access request if the traffic collected is related to access requests, a source Internet Protocol (IP) address of the collected network activity, a destination IP address for the network activity, a list of files that may have been accessed if the traffic collected is related to access requests, and other data in the network traffic). Current event data 111 may include information about a single instance of an event, such as a single access request to a file, or may include information about more than one event instance, such as for multiple file access requests.

At circle 4, the current event data 111 is received at blocks 113 and 114, but is not received at blocks 104 and 115.

In some embodiments, the system 100 at block 114 determines that a verification rule is triggered based on a combination of the current event data 111 and stored historical data. Historical data (not shown) may include past verification attempts and the responses to these verifications made by users. Historical data may also include logs of past triggering of rules. Further details regarding historical data will be described with reference to FIG. 2. For example, a verification rule may indicate that verification should be performed with a user's manager when that user has accessed files off-hours and where that user has previously accessed files off-hours more than 4 previous times within a time period.

In some embodiments, the system 100 at block 113 determines that a verification rule is triggered based on the current event data 111. The determination at block 113 is similar to that made at block 114, however it does not consider historical data; rather, the determination is made solely based on the current event data 111. For example, the current event data 111 may indicate that a user is attempting to log on to a machine that the user does not own, and a verification rule may indicate that verification should be performed in response to this current event data.

In some embodiments, the system 100 at block 115 determines that a verification rule is triggered based on the stored historical data. The determination at block 115 is similar to that made at block 114, however it does not consider current event data 111; rather, the determination is made solely based on stored historical data. In some embodiments, the system may periodically check the historical data to determine if a verification rule should be triggered. An example of a verification rule that is triggered based on stored historical data is one that determines that a verification should be sent when a user has not responded to 5 or more verification requests.

In some embodiments, the system 100 at block 104 determines that a verification rule is triggered based on the network traffic 153. In some embodiments, the system also bases this determination on short term network traffic history (e.g., traffic sent between the client end stations and enterprise resources over a short time period or a small amount of the same traffic). The determination made at block 104 may be performed within TCAM 102 and may not involve a collection rule 103. For example, a verification rule in block 104 may indicate that verification should be performed when File Transfer Protocol (FTP) packets are encountered requesting enterprise resources between the hours of 8 pm and 6 am (off-hours).

A few examples of verification rules are shown above, however system 100 may include other verification rules as well. In some embodiments, these verification rules are preconfigured by a system administrator. The types of verification rules that may be configured in the system are flexible and not limited to a certain paradigm. Verification rules may be triggered based on any aspect of the current event data and/or historical event data. Verification rules may be checked periodically, or upon the triggering of an event, such as the receipt of current event data. Verification rules may trigger based on activity tracked over time, or network activity occurring during an instant of time (e.g., less than a second). In some embodiments, learning methods may be used to automatically change the criteria for triggering based on an analysis of network traffic over a period of time. For example, it may be determined that a verification should now be sent for a type of network activity since that activity has recently begun to show atypical behavior from past activities of the same type.

Responsive to the determination 112, an activity context 105 is provided to a data access verification module (DAVM) 110. DAVM 110 may be a software module executing on a server end station, a specialized hardware module, or a combination of software and hardware. Further details regarding the implementation of DAVM 110 will be described herein with reference to FIGS. 2-3.

The activity context 105 may include one or more of the following data: 1) a rule identifier (ID) to identify the verification rule that is triggered, optionally with a description of the rule; 2) the current event data 111, if used; 3) a username associated with the (current and/or historical) data that triggered the rule; 4) a source IP address associated with the data that triggered the rule; 5) a destination IP address associated with the same data; 6) timestamp(s) associated with the data (e.g., when the event indicated in the data occurred); 7) files or folders accessed, machine account used (an account that is associated with a computing device on a one-to-one basis), and/or database accessed (including database query, database login, tables accessed, schema accessed, etc.) if any; and 8) relevant data from the stored historical data, if any (including historical event or verification data). Alternative embodiments may include more, less, and/or different data in the activity context 105 depending on the rule triggered or other requirements.

The DAVM 110 at circle A (block 116) selects the target role(s) and target user(s) for the verification based on the activity context and enterprise context. The target users (that belong to target roles) is intended to be the user(s) of the enterprise having the requisite knowledge to confirm whether or not the activity is indicative of the possible insider threat. While in some embodiments the target roles include the manger of user performing the activity, the owner of credentials under which the activity is being performed, the owner of machine being used to perform the activity, the director of the department to which the activity concerns, and/or the owner of data to which the activity pertains (e.g., the owner of the file, folder, database table, etc.); alternative embodiments include additional, fewer, or different target roles. For example, if the activity involves a sensitive human resources (HR) file, the verification will be with a target user having the requisite knowledge (the manager of the user, the director of the HR department, and/or the owner of the data) as opposed to an enterprise network administrator. Various examples of target role selection for different situations are described later herein with respect to FIGS. 5A-I. In some embodiments and circumstances, the verification is always with someone other than the enterprise network administrator (also known as system administrator), and an alert is generated for the enterprise network administrator depending on the outcome of the verification. This is an improvement over: 1) a system without verification because the consequence of having no verification method is that the security of the system is left vulnerable; 2) a system where the verifications are always towards the enterprise network admin(s) because they often lack the knowledge to confirm whether or not the activity is indicative of the possible insider threat, and thus ignore or routinely respond in a manner that indicates there is not an insider threat (this may even create a false sense of security); and 3) a system where the verification are always toward the owner of the user credentials being used for the access because this does not cover all situations and because it does not help relative to at least a malicious insider.

The enterprise context that the selection in block 116 is partly based on is represented in FIG. 1 by the enterprise context repository(ies) 140. The DAVM 110 may search or reference these enterprise context repositories 140 to determine the different roles 142 that users 141 have. Although the enterprise context repository 140 is represented in FIG. 1 as a single table, in practice the enterprise context is likely composed of multiple repositories, such as directory services, human resources databases, information technology (IT) inventory databases, and so on. In some embodiments, the enterprise context repositories also includes data about the enterprise that is learned in response to the TCAM 102 analyzing traffic (e.g., work hours for a specific group of users may be determined by analyzing the typical traffic for that group; IP addresses, host names and user names which can be used to determine roles such as owner of machine/owner of data (someone who created a file for example); this data may be determined and stored in different ways (e.g., determined and stored in the TCAM 102, determined and stored by a secure server responsive to receiving input from one or more TCAMs). Additional details for the enterprise context repositories 140 will be described with reference to FIG. 3B.

To perform the selection of block 116, in some embodiments DAVM 110 at block 118 selects a set of one or more target roles from a plurality of target roles based on the activity context and optionally based on the enterprise context. As noted previously, in some embodiments the activity context 105 includes a rule ID identifying the verification rule that was triggered in block 112. In such a case, the DAVM 110 may in block 118 use logic configured for the particular rule ID to determine the correct target role(s) to select. For example, if the DAVM 110 receives an activity context with a rule ID for a verification rule related to off-hours access, the DAVM 110 may then be configured for this particular rule ID to check the username identified in the activity context 105, and depending upon whether the username is a machine account or user credentials, select the target user to be the owner of the machine associated with the machine account or the owner of the user credentials, respectively. Further details regarding block 116 will be described below with reference to FIGS. 4 and 5A-5I.

To perform the selection of block 116, in some embodiments DAVM 110 at block 119 also selects a set of one or more target users in each of the selected set of target roles based on the enterprise context. The DAVM at block 119 discovers the set of one or more target users in each of the target roles selected at block 118 by searching the enterprise context repositories 140. For example, if the target role from block 118 is selected to be the owner of credentials "james_1", then the DAVM at block 119 may search an enterprise context repository 140 such as a directory services repository (e.g., Microsoft® Active Directory) to determine the user that is the owner of the credentials "james_1". In this case the user may be James 131a. This would be repeated for the other target roles that were selected at block 118. Some target roles may have multiple associated users and so more than one user may be selected. Not every target user may be in the same enterprise context repository 140 and so the DAVM 110 may search a variety of repositories for the requisite information. Further details regarding block 119 are described below with reference to FIG. 5A-5I.

In some embodiments, a set of verification rules works is designed with an escalation path or plan in mind. For example, a second of a set of two verification rules may be designed so that it is triggered when events surrounding the triggering of a first of the set of two verification rules are suspicious. For instance, the first of the set of verification rules may watch for particular suspicious network activity and may indicate a first target role for the verification, while the second of the set of verification rules may indicate a higher level target role (e.g., manager, supervisor, department head, chief executive officer, etc.) for verification and watch for some criteria indicative of a situation where the first rule is not deemed sufficient (e.g., repeated verifications with the same target user with a threshold amount of time). By way of a specific example, assume that there is a malicious insider for which network activity has triggered the first verification rule multiple times, but each time the malicious insider is selected as the target user and the malicious insider reacts to the verification request in a manner that indicates the activity is NOT indicative of a possible insider threat; the second verification rule criteria is designed to detect repeated verifications with a target user and cause a verification request to be sent the target user's supervisor (which, in this specific example, repeated verification with the malicious insider would result in verification with the supervisor of the malicious insider—in which case, the malicious insider's activity is brought to the attention of the malicious insider's supervisor, who can then respond accordingly). This escalation path allows further flexibility in selecting target user(s) and target role(s), and allows for greater accuracy in determining whether the network activity in question is legitimate.

At circle B, after the target role(s) and target user(s) are selected in circle A, the DAVM 110 at block 120 causes a verification request (or requests) to be sent to the target user (or users). Each verification request describes the activity and allows the selected target user to effectively confirm whether or not the activity is indicative of the possible insider threat (the term "effectively" is used here since the verification request may ask directly or the verification request may ask simpler question(s) that are expected to be more understandable to the selected target user; these simpler questions present the user with easy to understand prompts or requests instead of presenting the user with complex details (e.g., IP addresses, timestamps, detailed packet information, SQL query) that the user may not understand (some examples are provided below); this may allow the user to better respond to the verification request). In some embodiments, each verification request may be of a positive or negative type, and this drives the default action if no reply is received within a timeout period. A positive verification request is one where a user is asked to reply when the activity indicated in the request is legitimate, and may include a message asking for this (e.g, "please reply if the access was valid"). If the access was not valid, a positive verification does not necessarily require the user to respond—a failure to reply is interpreted as effectively confirming the activity is indicative of the possible insider threat. A negative verification request is one where a user is asked to respond when the activity indicated in the request is not legitimate (i.e., when it indicates a possible threat)—a failure to reply is interpreted as effectively confirming the activity is NOT indicative of the possible insider threat.

In addition, the verification request may include a challenge (e.g., a Completely Automated Public Turing test to tell Computers and Humans Apart (CAPCHA)) if the DAVM 110 has determined that the activity might have been initiated by an insider who has been compromised (e.g., by malware on a client end station of the insider).

At circle C, the verification request message 161 is sent to the target user(s) 130. The verification request message may be sent on a designated contact channel for the user, where the list of contact channels 144 for a user is stored in the enterprise context repository 140. These contact channels are typically out-of-band relative to the network traffic 153, and may include phone, text message, instant message, email, or other forms of communications. Thus, the verification request message is sent in a format appropriate for the designated contact channel. When and if the target user responds, a verification response message 162 is received from the target user(s) (e.g., users 131a-132a illustrated as respectively having roles 131b-132b) by the DAVM 110 at circle D.

At circle E, DAVM 110 at block 121 will cause an alert when a verification result, which is based on the verification request and any verification response, indicates (confirms) that the activity is indicative of a possible insider threat. For example, the verification result may be based on the type of verification request and a timeout for the verification being reached without a verification response being received. As another example, a verification response may be received from the user and effectively indicate that the activity is indicative of a possible insider threat. This alert may be sent to an enterprise network system administrator. Further details regarding block 120 and block 121 will be described below with reference to FIGS. 6-9.

The method and system described above is able to, in some embodiments, send a verification request to a selected target user to allow the target user to effectively confirm whether or not the detected network activity is indicative of a possible threat, such as an attack from a compromised insider or a malicious insider. Instead of selecting a default target user who may not be able to effectively verify whether a suspicious activity is legitimate or not, the method and system described above is able to select user(s) that are very likely to be able to identify whether the detected activity is legitimate or not. This provides an important advantage for an enterprise, as the enterprise can only effectively prevent threats if it has valid and effective data on which to act. Further embodiments of this method and system will be described below with reference to the remaining FIGS. 2-11.

Figure 3A:
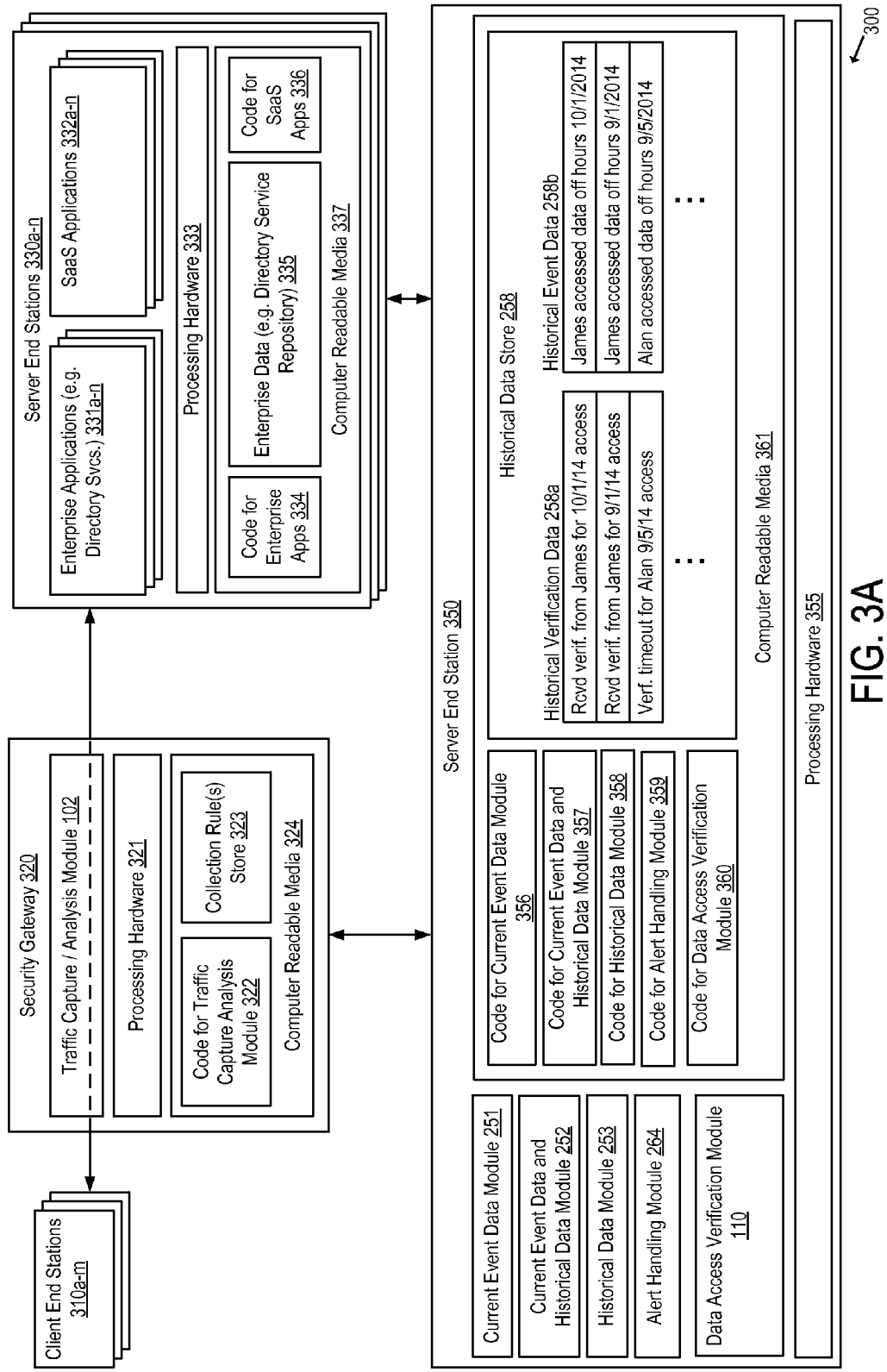
FIG. 3A is block diagram illustrating an exemplary implementation 300 according to an embodiment of the invention.

While FIG. 1 illustrates a single TCAM 102 and FIG. 3A a single security gateway 320, embodiments may have multiple TCAM 120/security gateways 320 reporting to a single DAVM 110 (which may be truly a single instance or be multiple distributed instances working in a coordinated fashion).

Figure 2:
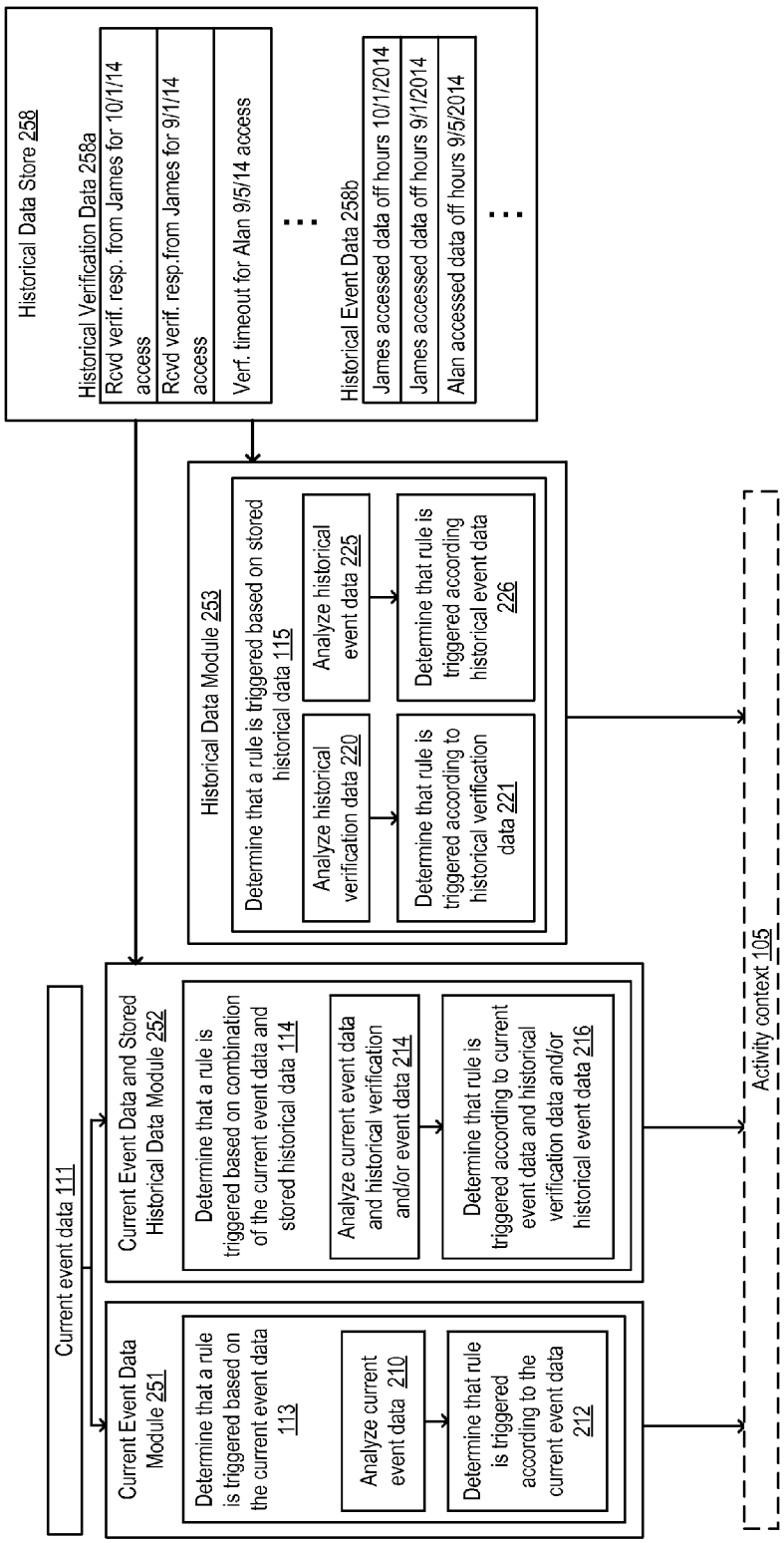
FIG. 2 is a block diagram illustrating an exemplary implementation of blocks 113, 114, and 115 for data access verification for enterprise resources according to an embodiment of the invention.

FIG. 2 is a block diagram illustrating an exemplary implementation of blocks 113, 114, and 115 for data access verification for enterprise resources according to an embodiment of the invention. The blocks within block 112 in FIG. 1 may be implemented in various modules shown in FIG. 2. Furthermore, as noted previously, some verification rules may be triggered based on stored historical data. This data may be stored in a historical data store, such as the historical data store 258 illustrated in FIG. 2.

Block 113 in FIG. 1 may be implemented in a current event data module 251 (hereinafter referred to as CDM 251). This module may be a hardware and/or software module. Once the CDM 251 receives the current event data 111, then at block 210 the CDM 251 analyzes the current event data. After analyzing the current event data, at block 212 the CDM 251 may determine that a verification rule is triggered according to the current event data. The CDM 251 at block 212 may analyze many aspects of the current event data in order to determine whether a verification rule is triggered. These aspects may include but are not limited to: packet headers, packet content, application messages/events, content of application messages/events, time of day of the collected activity, day of the week of the collected activity, amount of activity (traffic), source and destination of the activity, port used (e.g., in the case of Transmission Control Protocol (TCP)), whether encryption is used, whether packet structure or traffic structure is abnormal to standard specifications, the username associated with the activity (or lack thereof), the implied purpose of the network activity, the application from which the network traffic originated, and/or the application event related to the traffic.

In some embodiments, a verification rule may specify a set of criteria for certain values in the current event data, which if matched, not matched, or exceeded, would trigger the rule. For example, a verification rule that has as a matching criteria a destination folder name would trigger if the current event data has a destination folder name that matches the criteria. In some embodiments, a verification rule may include logic which operates on parts of the current event data and determines whether the verification rule is triggered. For example, a verification rule may have logic that indicates the rule should be triggered when a user is accessing enterprise resources during non-work hours.

Block 114 in FIG. 1 may be implemented in a current event data and stored historical data module 252 (hereinafter referred to as CHDM 252). This module may be a hardware and/or software module. Once the CHDM 252 receives the current event data 111, then at block 214 the CHDM 252 analyzes the current event data and historical verification and/or event data. Historical verification data 258a is stored data recording information about previous, or historical, verification requests, verification responses, and/or verification results. For example, historical verification data may include an entry indicating that a verification timed out for a user. Historical verification data 258a may also include additional details regarding the verification, including timestamps, the role of the user for which verification was sent, etc. The historical verification data 258a may also include information on when a request was sent, what contact channel was used, the activity context related to the verification, the text used in verification request, whether the response timed out, and what the response was from the user. Alternative embodiments may include more, less, or different information. In some embodiments, historical verification data 258a is stored in a historical data store 258. New entries may be added to the historical verification data 258a in response to a verification request being sent and/or received, and may be added by the DAVM 110. Although the historical verification data 258a in FIG. 2 is in the form of a table, in other embodiments the historical verification data 258a is stored in a different storage format, such as in a relational database, tree structure, or log file.

Historical event data 258b is stored data recording information about previous events, i.e., previous network activity which triggered a collection rule. Each historical event data entry may include a description of the event, the rule that was triggered, event data for the event, timestamp information, a link or indicator to one or more related verification entries in the historical verification data 258a, links or indicators to other related events, and other information related to the event in question. The historical event data 258b may also include the activity context related to the event (e.g., if the event was a database access, then the kind of query, database login, database accessed). Alternative embodiments may include more, less, or different information. In some embodiments, historical event data 258b is stored in the historical data store 258. New entries may be added to the historical event data 258*b* in response to new event data (e.g., current event data 111) being received. The new entries may be added by the TCAM 102 or the DAVM 110 or another module in the system. Although the historical event data 258*b* in FIG. 2 is in the form of a table, in other embodiments the historical event data 258*b* is stored in a different storage format, such as in a relational database, tree structure, or log file.

While in some embodiments the historical verification data 258*a* and historical event data 258*b* are maintained on the same computing device or storage device, alternative embodiments may distribute the data differently (e.g., across multiple computing devices).

At block 216, the CHDM 252 may determine that a rule is triggered according to the current event data and the historical verification and/or event data. For example, the current event data and the historical data may be analyzed to determine that a first user has accessed data off-hours more than 5 times in the past week. This may trigger a verification rule that causes a verification request message to be sent to second user whose role is manager of the first user.

Block 115 in FIG. 1 may be implemented in a historical data module 253 (hereinafter referred to as HDM 253). In contrast to the CDM 251 and the CHDM 252, the HDM 253 does not receive current event data 111, and does not perform any actions in response to receiving the current event data 111. Instead, it performs the actions of block 115: 1) periodically; 2) in response to a verification request; and/or 3) in response to a verification response. Thus, in contrast to the CDM 251 and the CHDM 252, the HDM 253 bases its analysis solely on the historical data, which may be stored in a historical data store 258.

At block 220, the HDM 253 analyzes historical verification data. As described above, historical verification data may be stored in the historical data store 258 and includes stored information regarding previous verifications. At block 221, the HDM 253 may determine that a verification rule is triggered according to the historical verification data. For example, the historical verification data may be analyzed to determine that a first user has not responded to at least 5 verification requests and these requests have timed out. This may trigger a verification rule that causes a verification request message to be sent to second user whose role is manager of the first user.

At block 225, the HDM 253 analyzes historical event data. As described above, historical event data may be stored in the historical data store 258 and includes stored information regarding previous events that triggered verification rules. At block 226, the HDM 253 may determine that a verification rule is triggered according to the historical event data. For example, the historical event data may be analyzed to determine that a first user has previously accessed data off-hours at least 5 times within a week. This may trigger a verification rule that causes a verification request message to be sent to second user whose role is manager of the first user.

Although the system 200 in FIG. 2 illustrates one combination of modules implementing the functionality of block 112 in FIG. 1, in other embodiments the functionality of block 112 is implemented using a different combination of hardware and/or software modules. Additional examples of verifications using current event data and/or historical data will also be described herein with reference to FIGS. 5A-5I.

FIG. 3A is block diagram illustrating an exemplary implementation 300 according to an embodiment of the invention. System 300 includes one or more client end stations 310*a-m*. Client end stations (e.g., workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) are computing devices operable to execute applications that, among other functions, can access the enterprise resources provided by the server end stations 330*a-n*. In other words, client end stations 310*a-m* are able to access enterprise resources.

Server end stations are computing devices on which applications execute and from which a user on a client end station may access and retrieve data. These applications may include enterprise applications 331*a-n* and software as a service (SaaS) applications 332*a-n*. The data may include enterprise data 335 (stored in computer readable media 337). In many cases, the applications running on the server end stations create, access, delete, and modify associated sets of enterprise data 335 that are stored on the server end stations 330. Thus, a directory services application within the enterprise applications 331*a-n* may be associated with a directory services repository in the enterprise data 335. Server end stations 330*a-n* may also include processing hardware 333 to execute the code 334 (stored in computer readable media 337) for the enterprise applications 331 and the code 336 (stored in computer readable media 337) for the SaaS applications 332.

In some embodiments, server end stations 330*a-n* can be database servers, file servers, web application servers, print servers, mail servers, gaming servers, and/or application servers. A web application server is system software (i.e., code running on top of an operating system) executed by server hardware (e.g., processing hardware 333 on server end stations 330*a-n*) upon which web applications run. Web application servers may include a web server (e.g. Apache, Microsoft® Internet Information Server (IIS), nginx, lighttpd), which delivers web pages upon the request of hypertext transfer protocol (HTTP) clients (i.e., software executing on an end station) using HTTP, and may also include an application server that executes procedures (i.e., programs, routines, scripts) of a web application.

Database servers are computer programs (i.e., code) that provide database services to other computer programs or computers, typically adhering to the client-server model of communication. Many web applications utilize database servers (e.g., relational databases such as PostgreSQL, MySQL, and Oracle, and non-relational databases, also known as NoSQL databases, such as MongoDB, Riak, CouchDB, Apache Cassandra and HBase) to store information received from HTTP clients and/or information to be displayed to HTTP clients. However, other non-web applications may also utilize database servers, including but not limited to accounting software, other business software, or research software.

A file server is system software (e.g., code running on top of an operating system, or as part of an operating system itself) typically executed by one or more server end stations 330 (each coupled to or including one or more storage devices) that allows applications or client end stations 310*a-m* to access to a file-system and/or files, typically allowing for the opening of files, reading of files, writing to files, and/or closing of files over a network. Further, while some file servers provide file-level access to storage, other file servers may provide block-level access to storage. File servers typically operate using any number of remote file-system access protocols, which allow client processes to access and/or manipulate remote files from across the Internet or within a same enterprise network (e.g., a corporate Intranet). Examples of remote file-system access protocols include, but are not limited to, the Network File System (NFS), WebNFS, Server Message Block (SMB)/Common Internet File System (CIFS), SAMBA, File Transfer Protocol (FTP), Web Distributed Authoring and Versioning (WebDAV), Apple Filing Protocol (AFP), Remote File System (RFS), etc. Another type of remote-file system access protocol is provided by Microsoft Sharepoint™, which is a web application platform providing content management and document and file management.

In some embodiments, enterprise data 335 on server end stations 330a-n may also include one or more enterprise context repositories 140 (not shown in FIG. 3a; shown in FIG. 1). These may be accessed by the DAVM 110 to determine the target user and/or target role for a verification request.

The client end stations 310 and the server end stations 330 frequently—but not at all points in time—operate within a same network (e.g. a local area network/LAN) controlled and/or operated by an enterprise. An enterprise is a business, organization, governmental body, or other collective body utilizing or providing the content and/or services of the server end stations 330. Some users of the client end stations 310 are deemed enterprise users, which are those users explicitly or implicitly part of the enterprise.

System 300 includes a security gateway 320. The set of server end stations 330 may be "protected" by a security gateway 320. Security gateways—such as firewalls, database firewalls, file system firewalls, and web application firewalls (WAFs)—are network security systems that protect enterprise resources on electronic devices (e.g., server end stations 330) within a network by analyzing and controlling the flow of network traffic passing through the security gateway 320 (e.g., from client end stations 310a-m). By analyzing packets and/or application message/event carried by packets flowing through the security gateway 320 and determining whether those packets should be allowed to continue traveling through the network, the security gateway 320 can prevent malicious traffic from reaching a protected server, modify the malicious traffic, and/or create an alert to trigger another responsive event or notify a user of the detection of the malicious traffic.

In an embodiment of the invention, the security gateway 320 is communicatively coupled between the client end stations 310 and the server end stations 330, such that all traffic destined to the server end stations 330 is first passed through (or made available to) the security gateway 320 for analysis. In some embodiments, the security gateway 320 executes as part of a separate server end station or a (dedicated or shared) network device; but in other embodiments, the security gateway 320 operates as part of server end stations 330 (for example, as a software module), or is implemented using or another type of electronic device and can be software, hardware, or a combination of both.

Security gateways are sometimes deployed as transparent inline bridges or routers. Transparent inline bridges and routers are placed between clients and servers, but are "transparent" to both the clients and servers. Thus, packets sent by a client to a server will arrive at the security gateway 320, be analyzed by the security gateway 320, and be blocked or forwarded on to the server when the packets are deemed acceptable by the security gateway. Accordingly, in transparent security gateway deployments, a client forms a communication connection directly with the server. Thus, in the case of secure websites using an encryption layer connection, a client forms the encryption layer connection directly with the server. Security gateways may also be deployed as a non-inline sniffer or reverse proxy or transparent proxy, any of which may be coupled to a switch or other network device forwarding network traffic between the client end stations 310 and the server end stations 330.

The security gateway includes the TCAM 102 as described herein with reference to FIG. 1. Intrusions may occur through a compromised client end station 310 assigned to one or more enterprise users that has been accessed or controlled by an intruder. In some instances, the intruder may have direct, physical access to the client end station 310, but in other instances, the intruder may be able to connect to the client end station 310 from a separate client end station existing either inside or outside the enterprise network. For example, the intruder may be granted access to the client end station 310 when an enterprise user accesses a malicious webpage (via the client end station 310) causing a malicious program or code (i.e., "malware") to be executed by the client end station 310. In other instances, the intruder is an enterprise user, but has a malicious intent and wishes to access data that he or she normally should not be accessing. This "malicious insider" may use his or her own client end station to access the enterprise resources or use a client end station belonging to another enterprise user.

Security gateway 320 also includes the code 322 for TCAM 102 on a computer readable media 324. Processing hardware 321 on security gateway 320 executes the code 322 to perform the operations and execute the functionality of TCAM 102 as described herein. Security gateway 320 may also include a collection rule store 323 to store the collection rules 103.

System 300 also includes a server end station 350. In some embodiments, server end station 350 includes the CDM 251, CHDM 252, HDM 253, DAVM 110, and an alert handling module (AHM) 254. The AHM 264 may send alert package to a designated user in response to the DAVM 110 causing an alert at block 121 as described with reference to FIG. 1. Server end station 350 also includes a computer readable media 361 that includes code 356-360 for the CDM 251, CHDM 252, HDM 253, AHM 264, and DAVM 110, respectively. The processing hardware 355 may execute the code 356-360 to perform the operations and execute the functionalities of the respective modules as described herein. Computer readable media 361 may also include the historical data store 258. The historical data store 258 stores historical verification data 258a and historical event data 258b that the CHDM 252 and the HDM 253 may use and is described herein with reference to FIG. 2.

While in some embodiments a variety of modules, code, and data are illustrated as being in the one server end station 350, alternative embodiments may distribute the module/code and data differently (e.g., across multiple computing devices). Further details regarding some possible deployment configurations of security gateway 320, TCAM 102, DAVM 110, the client end stations, and the server end stations, are described herein with reference to FIG. 11.

Figure 3B:
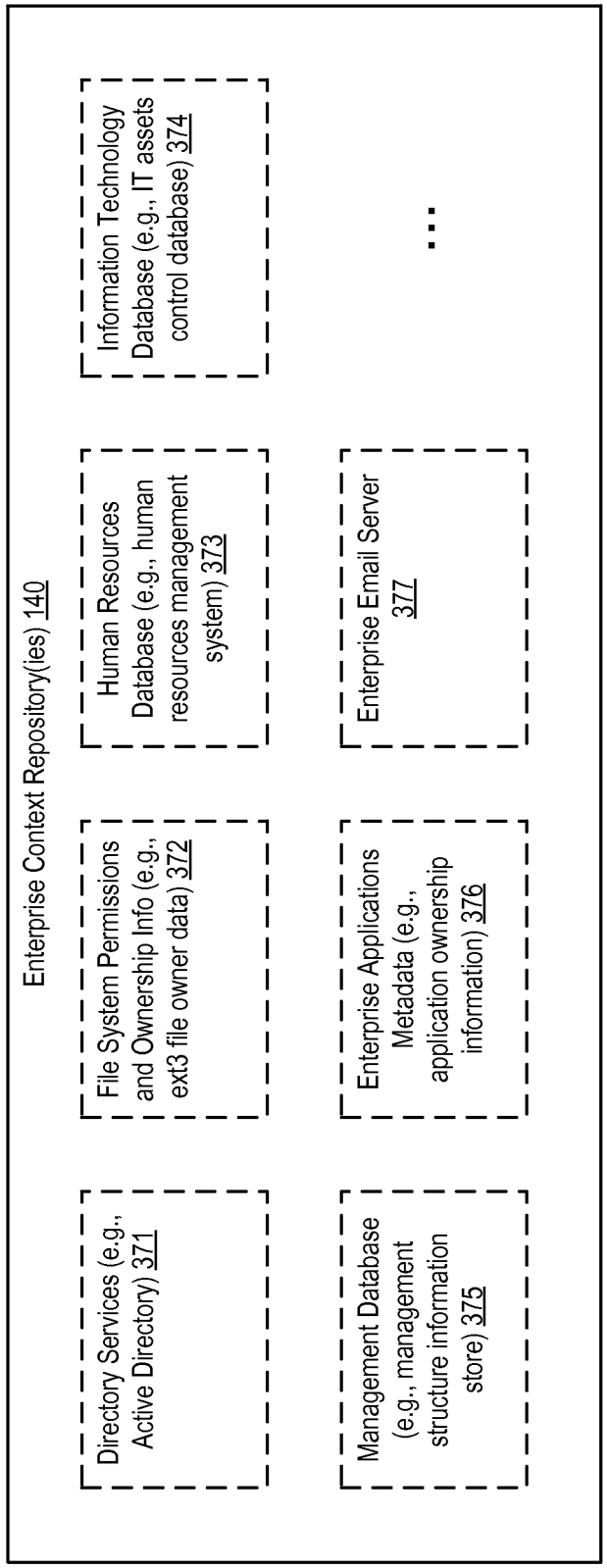
FIG. 3B is a block diagram illustrating exemplary enterprise context repositories 140 according to an embodiment of the invention.

FIG. 3B is a block diagram illustrating exemplary enterprise context repositories 140 according to an embodiment of the invention. As noted previously, enterprise context repositories 140 may include many different sources, and the DAVM 110 may search through one, some, or all of these sources to select the target user(s) and target role(s) (in block 116).

Enterprise context repositories 140 may include a directory service 371. A directory service 371 is a software system that stores, organizes, and provides access to information about resources in the associated enterprise network, including users, user groups, computing devices, storage devices, input/output devices, and other shared resources such as files, folders, etc. A directory service may map the names of network resources to their respective network addresses. Each resource on the network may be considered an object on the directory server. Information about a particular resource is stored as attributes of that object. Information within objects can be made secure so that only users with the available permissions are able to access it. This creates a shared information infrastructure for locating, managing, administering, and organizing common items and network resources. An example of a directory service is Microsoft® Active Directory. This information may be used to determine the owner of username credentials in the enterprise, other relationships between users and devices in the enterprise, and/or to select a contact channel for a user.

Enterprise context repositories 140 may include information 372 that is derived from file system permissions and ownership data. This information may be information that is stored along with the filesystem and may be different for each filesystem format (e.g., ext3, NTFS). However, modern filesystem formats typically indicate for each file or folder stored within that filesystem the user and group owner associated with the file or folder, as well as file/folder read, write, and execute permissions for different users and user groups, such as the user owner or for a user group comprising all other non-defined users. This information may be used to determine the owner of various files or folders.

Enterprise context repositories 140 may include information from human resources (HR) databases 373. This may be stored in a database that is associated with a human resources management system software (e.g., PeopleSoft®). This HR database 373 may include information regarding the structure of the organization. For example, it may indicate who serves as the manager of a user, and who the director of finance is in an organization. For each user, the HR database 373 may also include various contact methods for that user, as well as other information regarding the user that the HR department may use. This information may be used to find the manager of various users or key persons in the organization who may be able to make decisions regarding certain data.

Enterprise context repositories 140 may include information technology (IT) databases 374. This may be stored in a database associated with an inventory control system software for the IT department. This database 374 may include information regarding machine ownership or assignments between users and machines in the enterprise, and may include information regarding the machine account name associated with each computing device or client end station in the enterprise. This information may be used to find the owner of machines.

Enterprise context repositories 140 may include management databases 375. This may include information regarding the management structure of the organization. This information may have been prepared for various financial reporting or auditing purposes, and may be used to determine the organizational structure between users in the enterprise.

Enterprise context repositories 140 may include enterprise application metadata 376. This may be stored within or associated closely with the enterprise application itself, or may be stored in one of the previous repositories described herein. This information may be used to determine which user owns, has access to, or manages different enterprise applications in the enterprise.

Enterprise context repositories 140 may include enterprise email server 377. An enterprise email server 377 may handle incoming and outgoing emails for all users in the enterprise. It may also maintain and register the email addresses and other contact information for the users in the enterprise. This information may be used to determine contact information for users in the enterprise.

As discussed above, in some embodiments the enterprise context repositories also includes data about the enterprise learned responsive to the TCAM 102 analyzing traffic (e.g., work hours for a specific group of users may be determined by analyzing the typical traffic for that group; IP addresses, host names and user names which can be used to determine roles such as owner of machine/owner of data (someone who created a file for example); this data may be determined and stored in different ways (e.g., determined and stored in the TCAM 102, determined and stored by a secure server responsive to receiving input from one or more TCAMs).

The system is not limited to those enterprise context repositories 140 described herein, and in other embodiments there may be less, more, or a different set of enterprise context repositories 140.

Figure 4:
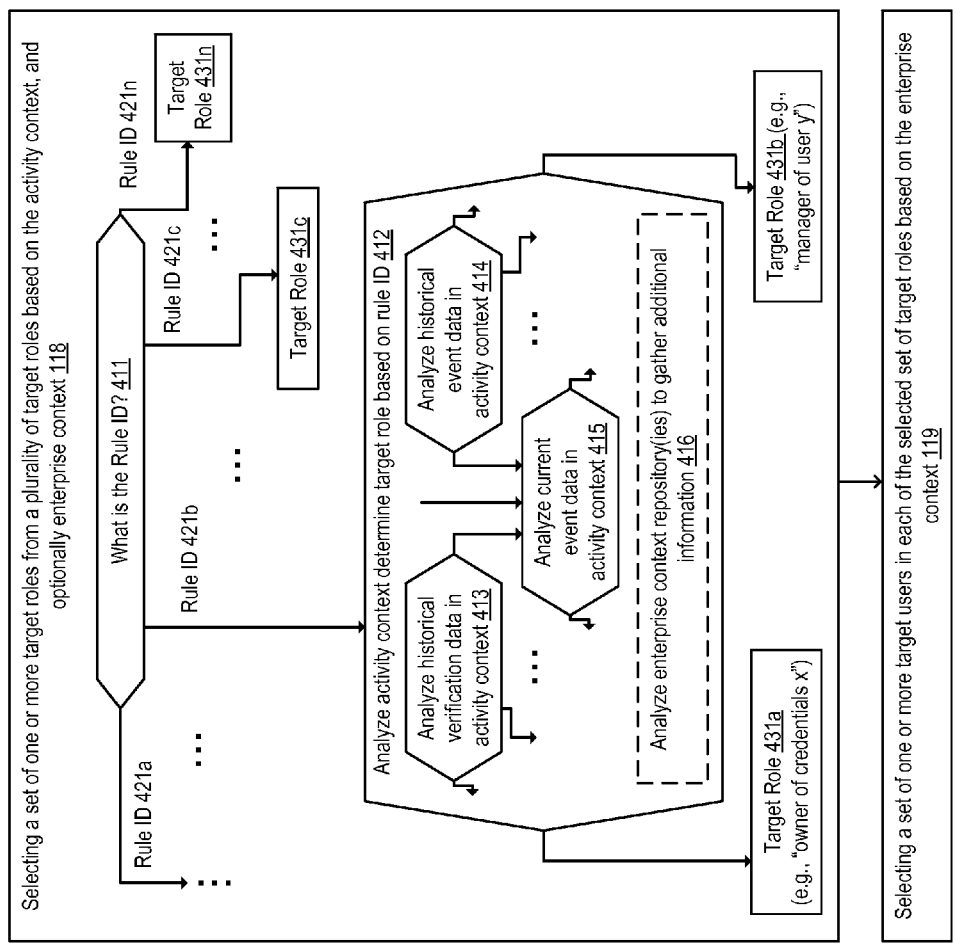
FIG. 4 is a flow diagram illustrating an exemplary implementation of block 118 according to an embodiment of the invention.

FIG. 4 is a flow diagram illustrating an exemplary implementation of block 118 according to an embodiment of the invention. As noted previously, after DAVM 110 receives the activity context 105, DAVM 110 selects a target role and target user for the verification based on the activity context and enterprise context at block 116. In some embodiments, DAVM 110 performs the operations of block 116 in two sub-blocks, blocks 118 and 119. At block 118, DAVM 110 selects a set of one or more target roles from a plurality of target roles based on the activity context, and optionally the enterprise context.

As noted previously, the activity context 105 may include a rule identifier identifying the verification rule that has been triggered. Within block 118, the DAVM 110 at decision block 411 determines the rule identifier present in the activity context 105. Based on the different rule IDs 421$a$-$n$, the DAVM 110 follows different logic paths. For some rule IDs, such as rule ID 421$c$, the DAVM 110 follows a logic path that immediately selects a target role, such as target role 431$c$. For other rule IDs, such as rule ID 421$b$, the DAVM 110 may need to perform additional analysis at decision block 412. In some embodiments, the different logic paths that the DAVM 110 may take depending on the rule ID are configured by an enterprise network administrator and/or hard-coded by the software programmer.

At decision block 412, the DAVM 110 analyzes the activity context 105 to determine the target role based on the previously determined rule ID. As noted previously, the activity context 105 may include current event data 111, historical event data related to the triggered rule, or historical verification data related to the triggered rule. The DAVM 110 may analyze any included historical verification data at block 413 to determine the target role to select. The DAVM 110 may also analyze any included historical event data at block 414 to determine the target role to select. In some cases, the analysis at either blocks 413 or 414 may be combined with further analysis of any included current event data at block 415 in order to determine the target role to select. In other cases, the current event data may be analyzed independently at block 415 to determine the correct target role to select. In some embodiments, the DAVM 110 at block 416 additionally consults one or more enterprise context repositories 140 to select the target role.

For example, if a verification rule for off-hours data access has been triggered, the DAVM 110 may analyze the username in the current event data in the activity context 105 to determine whether the target role to select is the owner of the credentials in the case where the username is a user credential, or the owner of the machine if the username is a machine account. As another example, if a verification rule requiring verification with a manager is triggered, the DAVM 110 may analyze the historical verification and/or event data to determine the username indicated in the historical data, find the user associated with the username in an enterprise repository, and then determine that the target role is the manager of that user.

Once the DAVM 110 completes the operations at block 412, it will select one or more target roles, such as target roles 431*a* and target role 431*b*.

FIGS. 5A-5I illustrate exemplary verification rules, exemplary paths taken through the system, and exemplary target roles/users for data access verification for enterprise resources according to some embodiments of the invention. Although in these embodiments these figures depict particular current event data, historical event data, rule IDs, roles, and users, this data is for illustrative purposes only, and the exemplary verification rules described herein may be triggered based on alternative data as well. Furthermore, although some verification rules are described herein, in other embodiments the system may include less, more, or different sets of verification rules. Although the verification rules shown in the figures described below are shown to be triggered at certain blocks within block 112, in other embodiments these rules may be triggered at one of the other blocks within block 112. For example, those rules triggered at block 104 may alternatively be triggered at block 114.

As described above, the verification response messages shown in FIGS. 5*a-i* may or may not be received.

Although verification response messages are shown to be sent from the user to the DAVM 110 in the FIGS. 5A-I, the user may fail to send a verification response message as discussed above. This may cause a timeout for that verification at the DAVM, cause an additional verification rule to be triggered, or cause another type of response as described herein. Such scenarios will not be described in detail in FIGS. 5A-5I, however embodiments of the DAVM 110 may perform the additional actions in response to such scenarios according to the embodiments described herein with reference to the other figures.

Figure 5A:
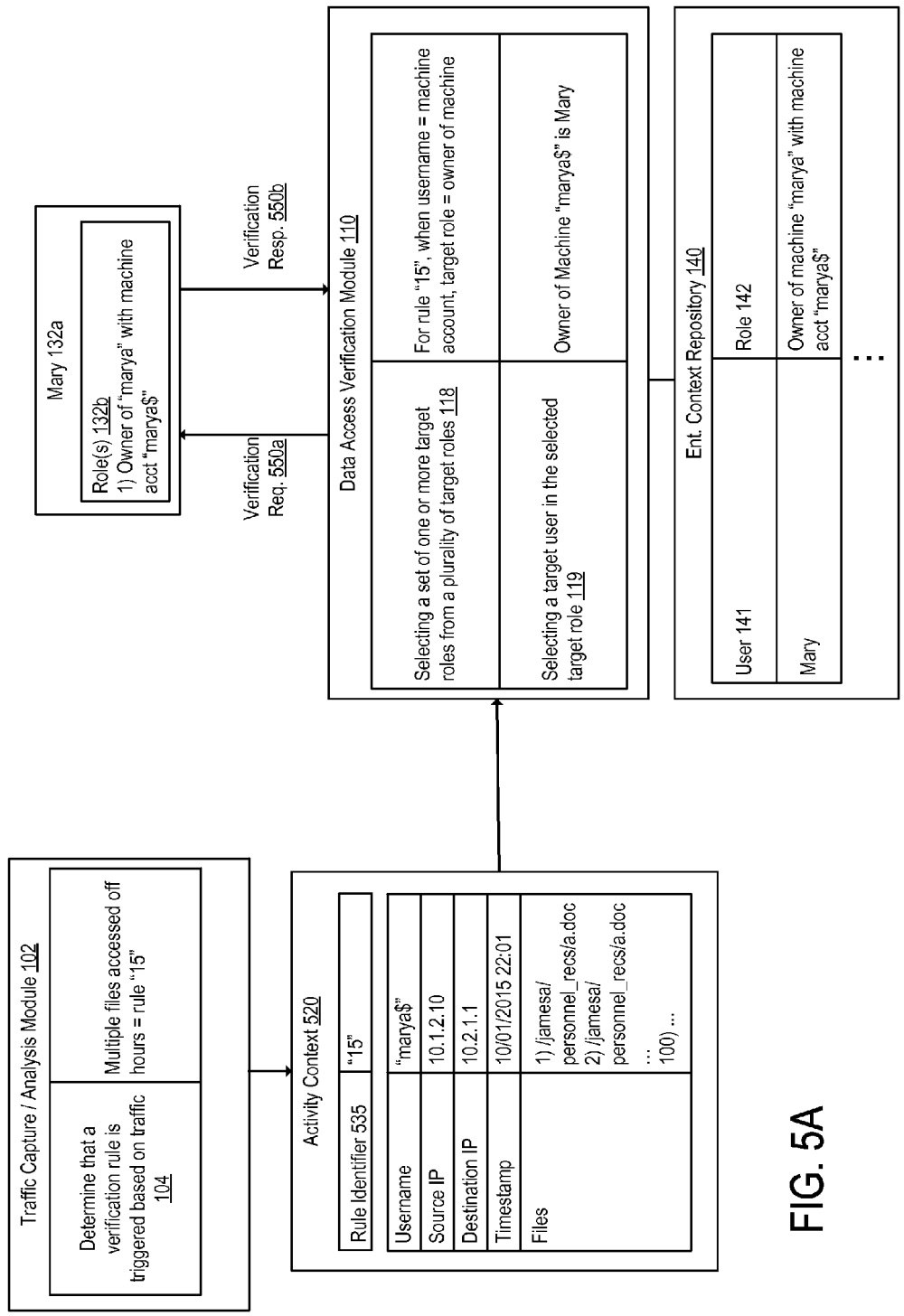
FIG. 5A illustrates an exemplary verification rule "15" triggered at the TCAM 102 for files accessed off hours according to an embodiment of the invention.

FIG. 5A illustrates an exemplary verification rule "15" triggered at the TCAM 102 for multiple files being accessed off hours according to an embodiment of the invention. The TCAM 102 determines that the current time is off-hours (i.e., outside of normal working hours, e.g., 9 am-5 pm). The TCAM 102 inspects network traffic that it receives and determines that the network traffic includes requests (e.g., application message(s)) to access a threshold number of files. In response, the TCAM 102 at block 104 triggers verification rule "15" (multiple files accessed off-hours). TCAM 102 then sends an activity context 520 to the DAVM 110. The activity context for this rule includes current event data. The activity context 520 may include: 1) the rule identifier 535, which is "15" in this case; 2) the username identified in the network traffic (e.g., in the packets that include the request (e.g., application message(s)) to access the files); 3) the source and destination IP addresses indicated in the packets; 4) a timestamp indicating when the access occurred; and 5) the list of files that were accessed as determined by the TCAM 102 from the packets (e.g., through text strings in the packet contents—that is, the application message(s) reconstructed from those packets).

DAVM 110 receives the activity context 520, and at block 118 DAVM 110 selects the target role from a plurality of target roles based on the activity context. In this case, the activity context indicates that the rule ID is "15". Thus, the DAVM 110 follows the logic for rule ID "15" at block 118.

In this case, the logic causes the DAVM 110 to check the username indicated in the activity context 520, and if the username is a machine account, as it is in the illustrated example ("marya$"), the DAVM 110 selects a target role that is the owner of the machine associated with that machine account, which in the illustrated example is the owner of the machine (computer) "marya" associated with the machine account "marya$". Although the names "marya" and "marya$" are used here to describe the machine and the machine account, in other embodiments these names may be different.

Subsequently, at block 119, the DAVM 110 selects the target user in the selected target role based on the enterprise context. The DAVM 110 searches the proper enterprise context repository 140 (e.g., a directory services repository) and determines the user associated with the machine account. In the illustrated example, that user is Mary 132*a*. Thus, the DAVM 110 selects the user Mary 132*a* as the target user. DAVM 110 then sends a verification request message 550*a* to the user Mary 132*a* on the appropriate contact channel. Mary's role 132*b* includes the owner of "marya" with machine account "marya$". Mary may then respond with a verification response message 550*b*.

Figure 5B:
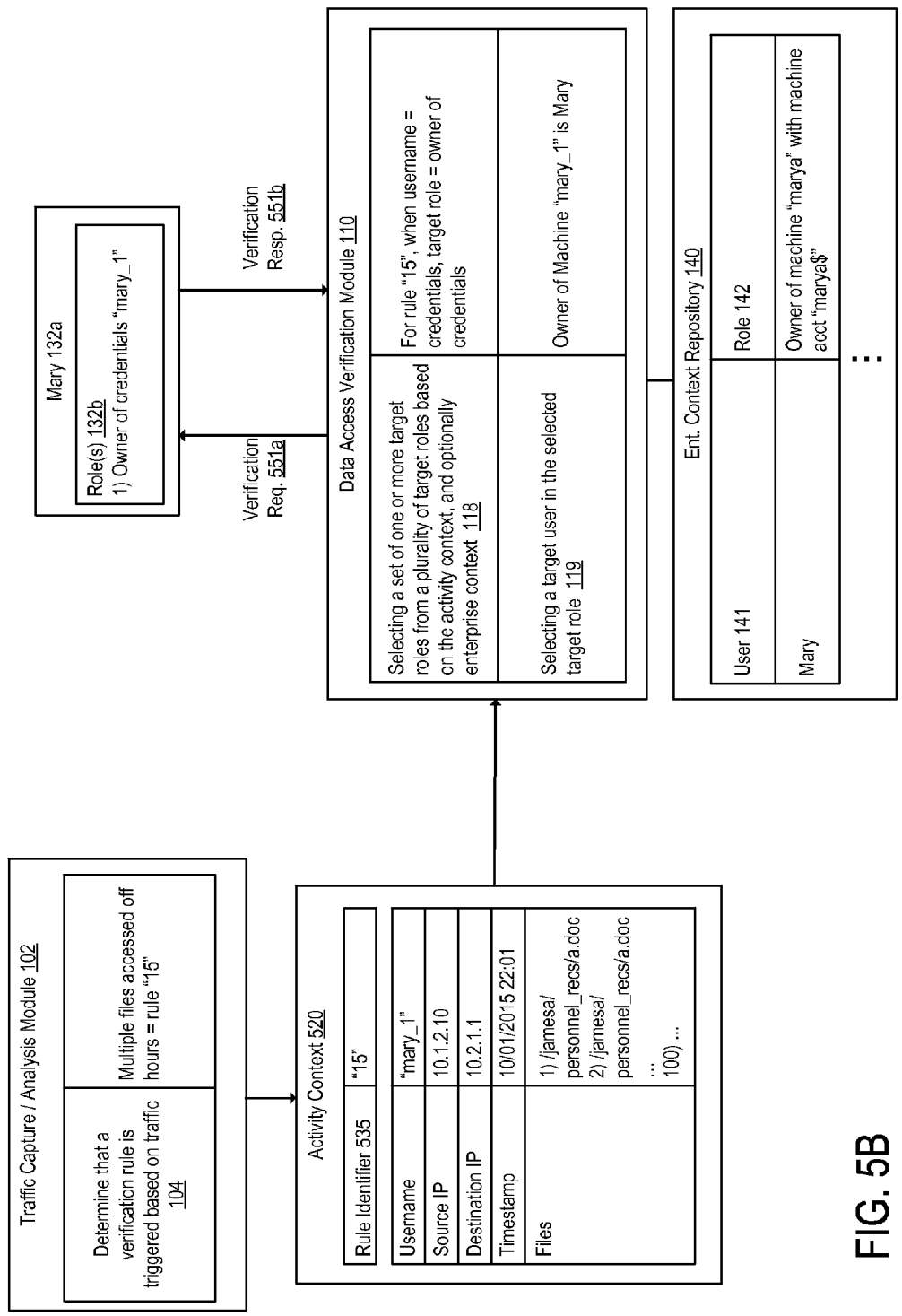
FIG. 5B illustrates an exemplary verification rule "15" triggered at the TCAM 102 for another instance of files accessed off hours according to an embodiment of the invention.

FIG. 5B illustrates an exemplary verification rule "15" triggered at the TCAM 102 for another instance of multiple files being accessed off hours according to an embodiment of the invention. While FIG. 5A illustrates the rule being triggered with activity context having a username belonging to a machine account, FIG. 5B illustrates the same rule being triggered with a username belonging to an individual.

The TCAM 102 determines that the current time is off-hours (i.e., outside of normal working hours, e.g., 9 am-5 pm). The TCAM 102 inspects network traffic that it receives and determines that the network traffic includes requests (e.g., application message(s)) to access a threshold number of files. In response, the TCAM 102 at block 104 again triggers verification rule "15" (files accessed off-hours). TCAM 102 then again sends an activity context 520 to the DAVM 110. The activity context 520 for this verification rule includes current event data. The activity context 520 may include the same information as described above with reference to FIG. 5A.

DAVM 110 receives the activity context 520, and at block 118 DAVM 110 selects the target role from a plurality of target roles based on the activity context. In this case, the activity context indicates that the rule ID is "15". Thus, the DAVM 110 follows the logic for rule ID "15" at block 118. In this case, since the username indicated in the activity context 520 is a user credentials ("mary_1"), the DAVM 110 selects a target role that is the owner of the user credentials, which in the illustrated example is the owner of the user credentials "mary_1". In some embodiments, the logic may be configured to cause the DAVM 110 to distinguish between machine accounts and user credentials based on a special character within the username, such as the symbol "$".

Subsequently, at block 119, the DAVM 110 selects the target user in the selected target role based on the enterprise context. The DAVM 110 searches the proper enterprise context repository 140 (e.g., a directory services repository) and determines the user that owns the user credentials specified from block 118. In the illustrated example, that user is Mary 132*a* and Mary 132*a* is selected as the target user. DAVM 110 then sends a verification request message 551*a* to the user Mary 132*a* on the appropriate contact channel Mary's role 132*b* includes the owner of user credentials"mary_1". Mary may then respond with a verification response message 551*b*. Thus, FIGS. 5A-B illustrate an example of where the target role selection is not solely based on the rule identifier as discussed above.

Figure 5C:
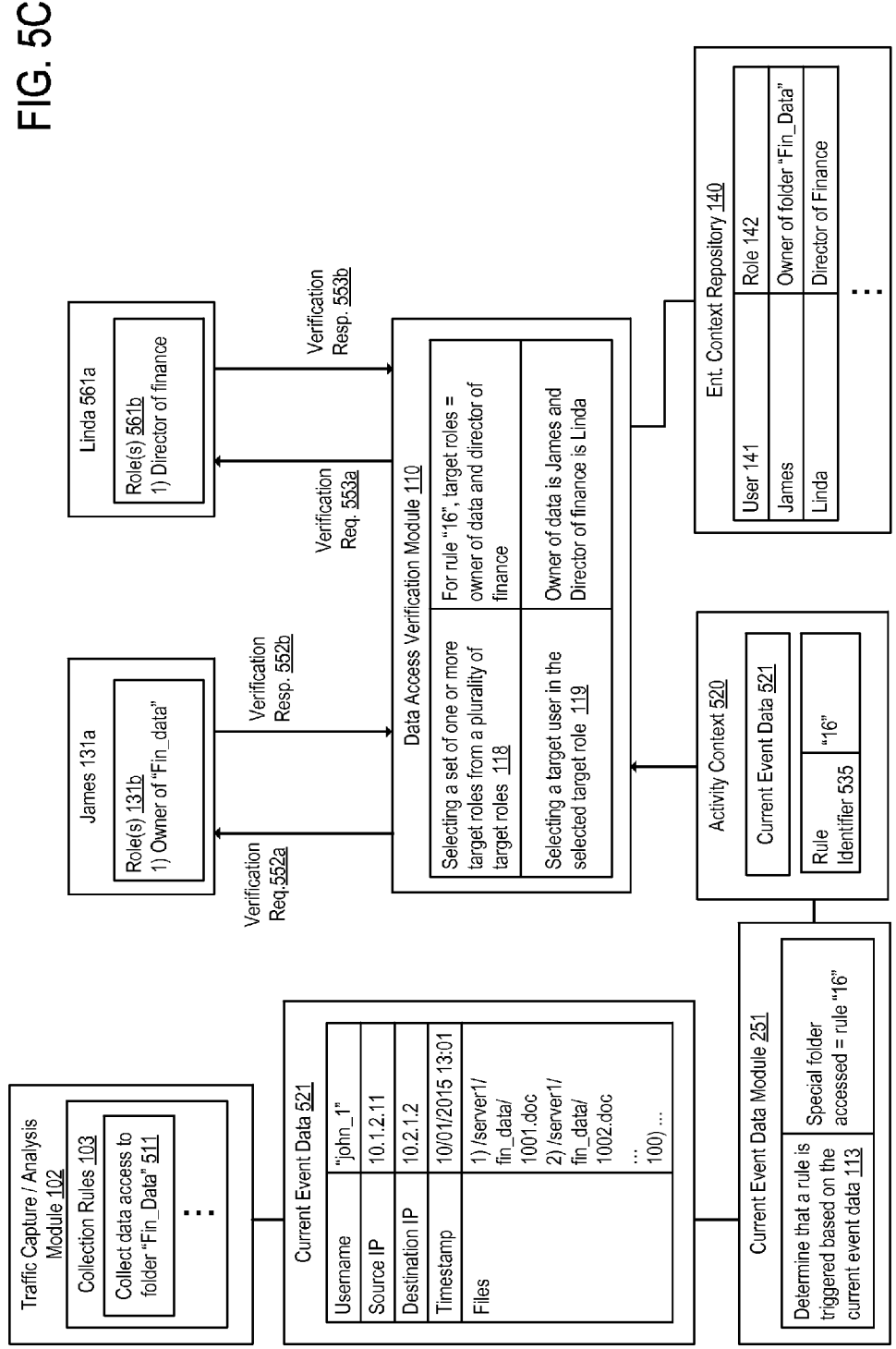
FIG. 5C illustrates an exemplary verification rule "16" triggered at the CDM 251 for an access to a folder designated as sensitive in the enterprise data according to an embodiment of the invention.

FIG. 5C illustrates an exemplary verification rule "16" triggered at the CDM 251 for an access to a folder designated as sensitive in the enterprise data according to an embodiment of the invention.

The illustrated exemplary verification rule "16" indicates that any access to a folder designated as sensitive that includes financial data (represented here as "Fin_data") should require a verification to the owner of the folder and the director of finance of the enterprise. For this verification rule, the TCAM 102 has a collection rule 511 to collect data accesses to the sensitive financial data "Fin_data". The TCAM 102 inspects network traffic that it receives and determines that the network traffic include requests (e.g., application message(s)) to access the folder "Fin_data" (which may be determined from text strings in the packet content or headers). In response, the TCAM 102 generates a current event data 521 including information gathered from the packets (e.g., application message(s) carried by those packets) requesting access to the folder "Fin_data" as well as metadata about the access. Current event data 521 may include the username associated with the access ("john_1"), the source and destination IP of the packets, the timestamp of the access, and the files within "Fin_data" which were requested.

As described with reference to FIG. 2, this current event data 521 may be sent to the CDM 251 and the CHDM 252, among other locations. Block 113 at the CDM 251 determines that verification rule "16" has been triggered based on analysis of the current event data. In response, the CDM 251 then sends an activity context 520 to the DAVM 110. The activity context 520 may include the current event data 521, and may also include a rule identifier 535 identifying the rule ID of the verification rule that was triggered (e.g., "16"). The current event data 521 is also received at the CHDM 252, and block 114 at CHDM 252 may separately determine that a separate verification rule is triggered. In such a case, the DAVM 110 may process each verification independently of the other.

DAVM 110 receives activity context 520, and at block 118 the DAVM 110 selects the target role from a plurality of target roles based on the activity context 520. In this case, the activity context 520 indicates that the rule ID is "16". Thus, the DAVM 110 follows the logic for rule ID "16" at block 118. In this case, the logic causes the DAVM 110 to select two target roles, with these roles being the owner of the folder "Fin_data" and the director of finance.

Subsequently, at block 119, the DAVM 110 selects the target user in the selected target role based on the enterprise context. The DAVM 110 searches the proper enterprise context repository 140 (e.g., a directory services repository and/or management structure information) and determines the user that owns the folder "Fin_data" and the user who is the director of finance. In the illustrated example, these users are James 131*a* and Linda 561*a*, respectively. Thus, the DAVM 110 selects the user James 131*a* and Linda 132*a* as the target user. DAVM 110 then sends a verification request message 552*a* to the user James 131*a* on the appropriate contact channel, and a verification request message 553*a* to the user Linda 561*a* on the appropriate channel. These two users may respond with verification response messages 552*b* and 553*b*, respectively. While typically these two users may respond to the verification requests with responses that both effectively indicate the same thing, in some cases the two users' responses may differ. For example, one user may indicate that the access is OK, and the other may indicate that the access is not OK. In such a case, the DAVM 110 may send an alert to a system administrator or other designated user (i.e., the verification result, which is based on the verification request and any verification response, indicates that the activity is indicative of the possible insider threat); the alert may indicate a conflict between two verification response messages regarding the same activity.

In some embodiments, the collection rule 511 may collect access information for multiple folders. In such a case, at block 118, the DAVM 110 may include logic that selects different target roles for each folder based on the name or type of the folder (e.g., director of engineering, director of human resources, etc.). In some embodiments, the system operates on files as well in addition or in lieu of folders.

Figure 5D:
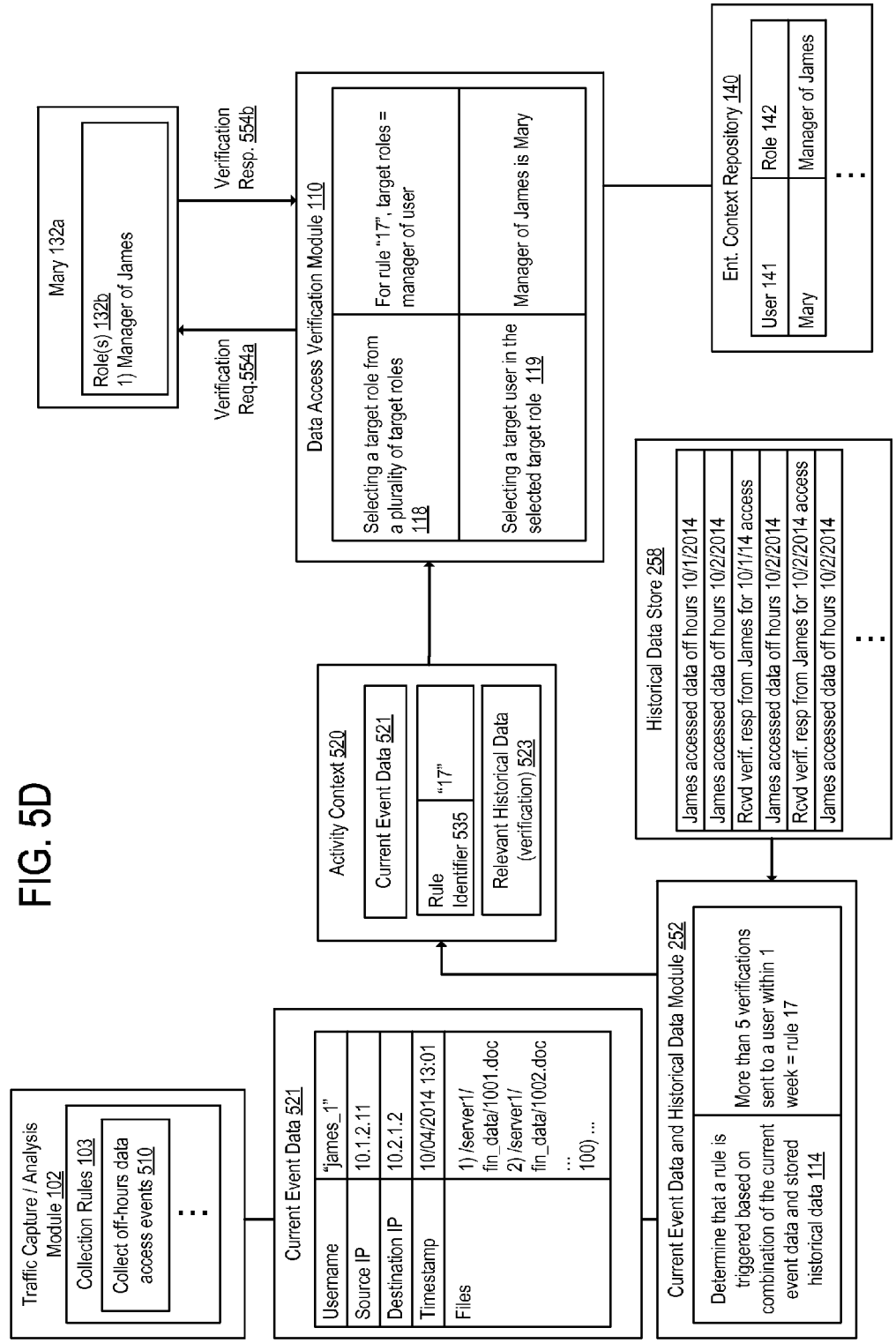
FIG. 5D illustrates an exemplary verification rule "17" triggered at the CHDM 252 for more than five verification requests made in a week according to an embodiment of the invention.

FIG. 5D illustrates an exemplary verification rule "17" triggered at the CHDM 252 for more than five verification requests made in a week according to an embodiment of the invention.

The illustrated exemplary verification rule "17" indicates if more than five verification requests are sent to a user within a 1 week window, then a verification request should be sent to the user's manager. For this verification rule, the particular collection rule at the TCAM 102 is not important as the rule is concerned with excessive verifications for one user. Thus, any current event data 521 generated by the TCAM 102 that would trigger a verification rule to send a verification to that one user may be applicable here. In the illustrated example, the collection rule 510 collects off-hours data access events. The TCAM 102 generates a current event data 521 including information gathered from packets (e.g., application message(s) carried by those packets) as well as metadata about the access that triggered the collection rule. In this case, current event data 521 may include the username associated with the access ("james_1"), the source and destination IP of the packets, the timestamp of the access, and the files which were requested.

As described with reference to FIG. 2, this current event data 521 may be sent to the CDM 251 and the CHDM 252, among other locations. Block 114 at the CHDM 252 determines that verification rule "17" has been triggered based on the received current event data 521 and based on querying the historical data store 258 as the particular username "james_1" has had more than five verification requests made in the past week including the verification request that is to be made for the current event that was just triggered. As noted previously, the historical data store 258 may store historical verification data, including the username related to the past verifications. In response, the CHDM 252 then sends an activity context 520 to the DAVM 110. The activity context 520 may include the current event data 521, and may also include a rule identifier 535 identifying the rule ID of the verification rule that was triggered (e.g., "17"). The activity context 520 may also include the relevant historical data 523 that is related to the verification rule that is triggered. For example, in the illustrated example, relevant historical data 523 may include the data in the historical data store 258 related to the prior verifications for that username. As noted previously, the current event data is also received at the CDM 251, and may be processed accordingly. Note that although the number of verifications and the time period is set to five and 1 week in this example, in other embodiments these values are different.

DAVM 110 receives activity context 520, and at block 118 the DAVM 110 selects the target role from a plurality of target roles based on the activity context. In this case, the activity context indicates that the rule ID is "17". Thus, the DAVM 110 follows the logic for rule ID "17" at block 118, and this logic causes the DAVM 110 to select as the target role the manager of the user identified by the username in the activity context 520 ("james_1"). In some embodiments, the username is also specified in the relevant historical data 523 and the DAVM 110 may use the relevant historical data 523 to find the username.

Subsequently, at block 119, the DAVM 110 selects the target user in the selected target role based on the enterprise context. The DAVM 110 searches the proper enterprise context repository 140 (e.g., a directory services repository) and determines the user that is the manager of the user identified by the username specified from block 118. In the illustrated example, Mary 132*a* is the manager of James, the user that is identified by the username "james_1" in the current event data 521. Thus, the DAVM 110 selects the user Mary 132*a* as the target user. DAVM 110 then sends a verification request message 554*a* to the user Mary 132*a* on the appropriate contact channel Mary 132*a* may then respond with a verification response message 554*b*.

Figure 5E:
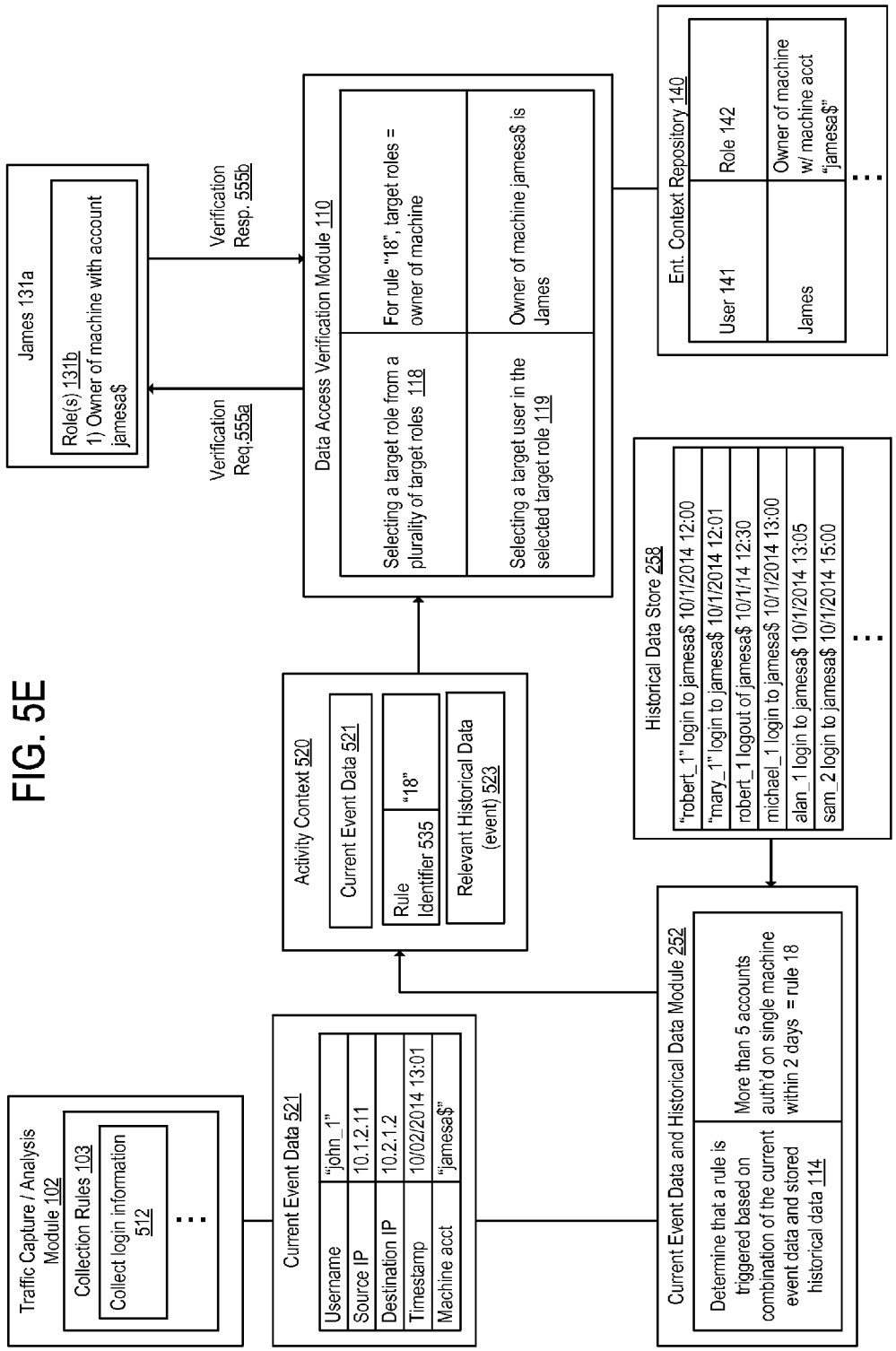
FIG. 5E illustrates an exemplary verification rule "18" triggered at the CHDM 252 for more than five accounts logged in or authorized on a single machine within two days according to an embodiment of the invention.

FIG. 5E illustrates an exemplary verification rule "18" triggered at the CHDM 252 for more than five accounts logged in or authorized on a single machine within two days according to an embodiment of the invention.

The illustrated exemplary verification rule "18" indicates that if more than five accounts are logged on to a single machine within a two day period, then a verification request should be sent to the owner of the machine. For this verification rule, the TCAM 102 includes a collection rule 512 to collect login information (e.g., login requests). The TCAM 102 inspects network traffic that it receives and determines that the network traffic includes requests (e.g., application message(s)) to login to a machine (which may be determined from text strings in the packet content or headers), and in some embodiments the responses to those requests to confirm that they were successful. In response, the TCAM 102 generates a current event data 521 including information gathered from these packets (e.g., application message(s) carried by those packets) as well as metadata about the access. In this case, current event data 521 may include the username associated with the access ("john_1"), the source and destination IP of the packets, the timestamp of the access, and the machine account identifying the machine that the current login is being made against. In other embodiments, the machine may be identified using a different identifier, such as a network domain name.

As described with reference to FIG. 2, this current event data 521 may be sent to the CDM 251 and the CHDM 252, among other locations. Block 114 at the CHDM 252 determines that verification rule "18" has been triggered based on the received current event data 521 and based on querying the historical data store 258 as the particular machine associated with machine account "jamesa$" has been logged into five times in the past two days including the login recorded in the current event data 521 that was just received. As noted previously, the historical data store 258 may store historical event data, including login information from previous logins collected from the collection rule 512. In response, the CHDM 252 then sends an activity context 520 to the DAVM 110. The activity context 520 may include the current event data 521, and may also include a rule identifier 535 identifying the rule ID of the verification rule that was triggered (e.g., "18"). The activity context 520 may also include the relevant historical data 523 that is related to the verification rule that is triggered. For example, in the illustrated example, relevant historical data 523 may include the data in the historical data store 258 related to the prior logins for that machine. As noted previously, the current event data is also received at the CDM 251, and may be processed accordingly. Note that although the number of accounts and the time period is set to five and two days in this example, in other embodiments these values are different.

DAVM 110 receives activity context 520, and at block 118 the DAVM 110 selects the target role from a plurality of target roles based on the activity context. In this case, the activity context indicates that the rule ID is "18". Thus, the DAVM 110 follows the logic for rule ID "18" at block 118, and this logic causes the DAVM 110 to select as the target role the owner of the machine associated with the machine account specified in the activity context 520. In this case that target role is the owner of machine with machine account "jamesa$". In some embodiments, the username is also specified in the relevant historical data 523 and the DAVM 110 may use the relevant historical data 523 to find the username.

Subsequently, at block 119, the DAVM 110 selects the target user in the selected target role based on the enterprise context. The DAVM 110 searches the proper enterprise context repository 140 (e.g., a directory services repository) and determines the user that is the owner of the machine with the machine account specified from block 118. In the illustrated example, James is the owner of the machine. Thus, the DAVM 110 selects the user James 131*a* as the target user. DAVM 110 then sends a verification request message 555*a* to the user James 131*a* on the appropriate contact channel. James 131*a* may then respond with a verification response message 555*b*.

Figure 5F:
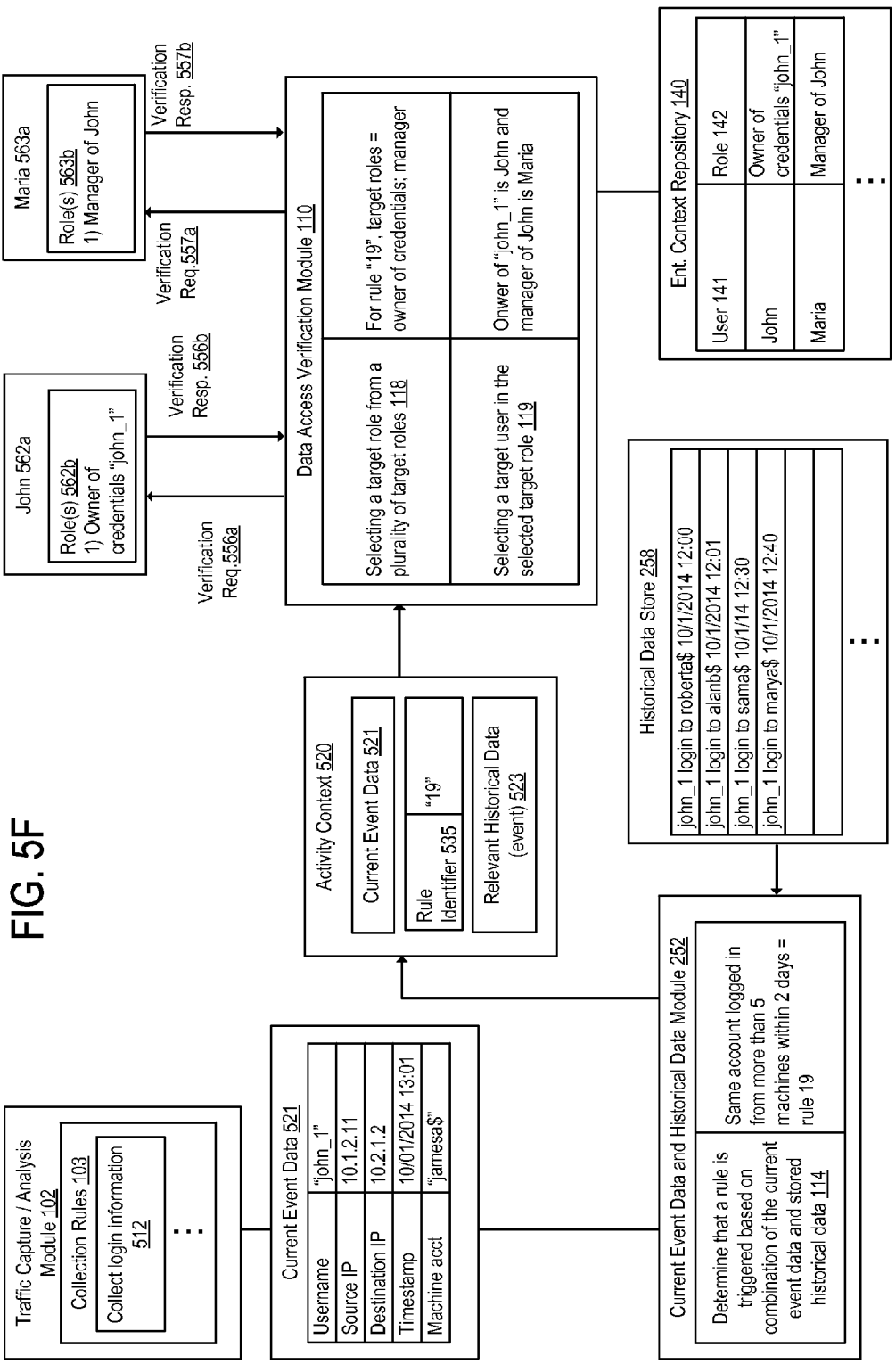
FIG. 5F illustrates an exemplary verification rule "19" triggered at the CHDM 252 for one account logged in to more than five machines within two days according to an embodiment of the invention.

FIG. 5F illustrates an exemplary verification rule "19" triggered at the CHDM 252 for one account logged in to more than five machines within two days according to an embodiment of the invention.

The illustrated exemplary verification rule "19" indicates that if one user is logged into more than five machines within a two day period, then a verification request should be sent to the user and the manager of that user. For this verification rule, the TCAM 102 includes a collection rule 512 to collect login information. The TCAM 102 inspects network traffic that it receives and determines the network traffic includes requests (e.g., application message(s)) to login to a machine (which may be determined from text strings in the packet content or headers), and in some embodiments the responses to those requests to confirm that they were successful. In response, the TCAM 102 generates a current event data 521 including information gathered from these packets (e.g., application message(s) carried by those packets) as well as metadata about the access. In this case, current event data 521 may include the username associated with the access ("john_1"), the source and destination IP of the packets, the timestamp of the access, and the machine account identifying the machine that the login is being made against. In other embodiments, the machine may be identified using a different identifier, such as a network domain name.

As described with reference to FIG. 2, this current event data 521 may be sent to the CDM 251 and the CHDM 252, among other locations. Block 114 at the CHDM 252 determines that verification rule "19" has been triggered based on the received current event data 521 and based on querying the historical data store 258 as the particular username "john_1" has logged into five different machines in the past two days including the login recorded in the current event data 521 that was just received. As noted previously, the historical data store 258 may store historical event data, including login information from previous logins collected from the collection rule 512. In response, the CHDM 252 then sends an activity context 520 to the DAVM 110. The activity context 520 may include the current event data 521, and may also include a rule identifier 535 identifying the rule ID of the verification rule that was triggered (e.g., "19"). The activity context 520 may also include the relevant historical data 523 that is related to the verification rule that is triggered. For example, in the illustrated example, relevant historical data 523 may include the data in the historical data store 258 related to the prior logins for that username. As noted previously, the current event data is also received at the CDM 251, and may be processed accordingly. Note that although the number of machines and the time period is set to five and two days in this example, in other embodiments these values are different.

DAVM 110 receives activity context 520, and at block 118 the DAVM 110 selects the target role from a plurality of target roles based on the activity context. In this case, the activity context indicates that the rule ID is "19". Thus, the DAVM 110 follows the logic for rule ID "19" at block 118, and this logic causes the DAVM 110 to select as the target role the owner of the username (user credentials) that is specified in the activity context 520 and as a second target role the manager of the user that owns that username. In the illustrated example the target roles are the user that is owner of the user credentials "john_1" and the manager of this user. In some embodiments, the username is also specified in the relevant historical data 523 and the DAVM 110 may use the relevant historical data 523 to find the username.

Subsequently, at block 119, the DAVM 110 selects the target users in the selected target roles based on the enterprise context. The DAVM 110 searches the proper enterprise context repository 140 (e.g., a directory services repository) and determines the user that is the owner of the user credentials specified from block 118. In some embodiments, the user is also identified in the relevant historical data 523, and the DAVM 110 may use this information to determine the same information from the enterprise context. In the illustrated example, John is the owner of the credentials "john_1". The DAVM 110 also searches the proper enterprise context repository 140 and determines that Maria is John's manager. Thus, the DAVM 110 selects the users John 562a and Maria 563a as the target users. DAVM 110 then sends verification request messages 556a and 557a to James 131a and Maria 563a on the appropriate contact channels. James 131a and Maria 563a may then respond with verification response messages 556b and 557b. Responses are handled in similar manner as described above.

Figure 5G:
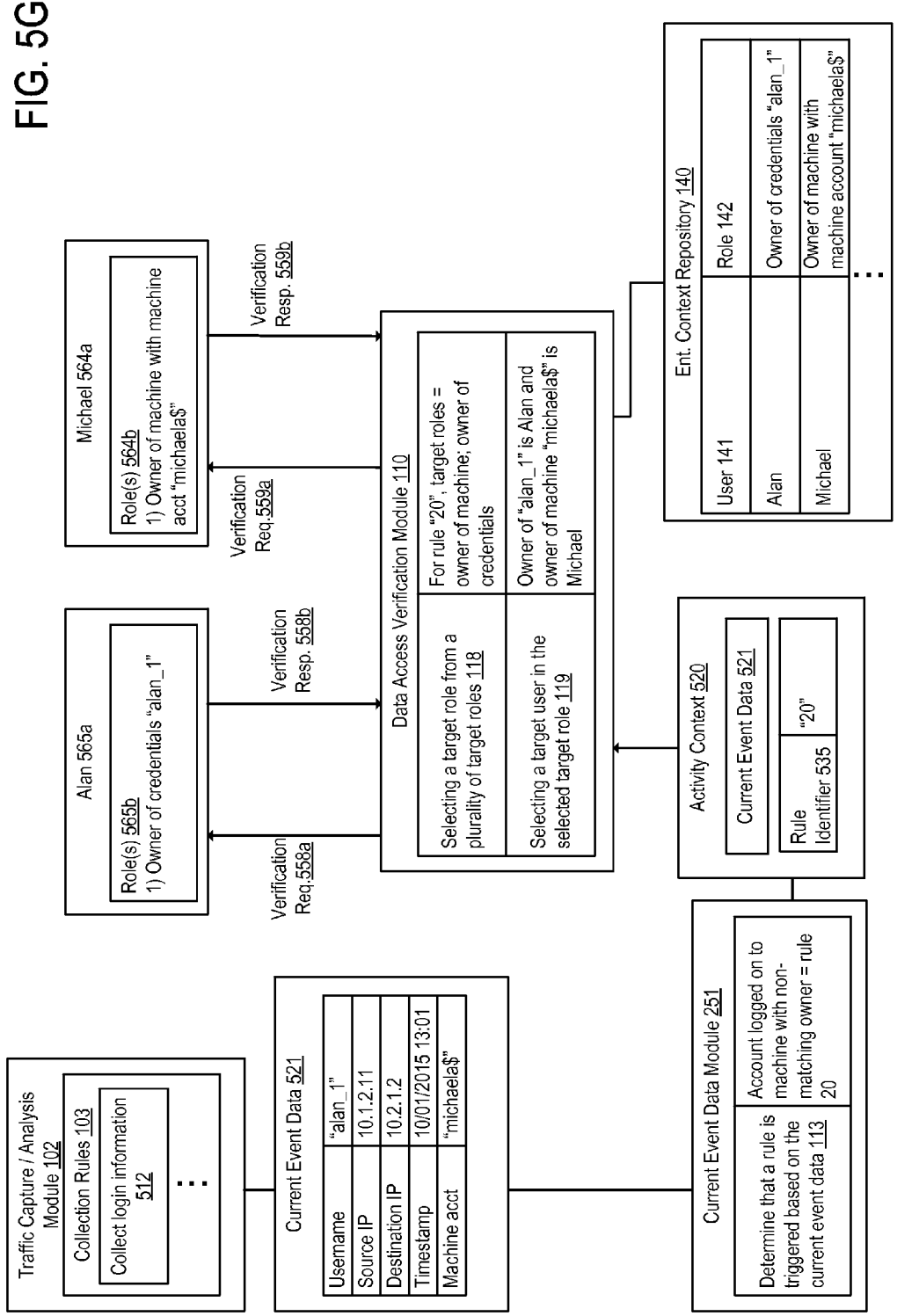
FIG. 5G illustrates an exemplary verification rule "20" triggered at the CDM 251 for one account logged in to a machine with a non-matching owner according to an embodiment of the invention.

FIG. 5G illustrates an exemplary verification rule "20" triggered at the CDM 251 for one account logged in to a machine with a non-matching owner according to an embodiment of the invention.

The illustrated exemplary verification rule "20" indicates that if one user is logged into a machine that that user does not own, then a verification request should be sent to the user and the owner of the machine. For this verification rule, the TCAM 102 includes a collection rule 512 to collect login information. The TCAM 102 inspects network traffic that it receives and determines that the network traffic includes requests (e.g., application message(s)) to login to a machine (which may be determined from text strings in the packet content or headers), and in some embodiments the responses to those requests to confirm that they were successful. In response, the TCAM 102 generates a current event data 521 including information gathered from these packets (e.g., application message(s) carried by those packets) as well as metadata about the access. In this case, current event data 521 may include the username associated with the access ("john_1"), the source and destination IP of the packets, the timestamp of the access, and the machine account identifying the machine that the login is being made against. In other embodiments, the machine may be identified using a different identifier, such as a network domain name.

As described with reference to FIG. 2, this current event data 521 may be sent to the CDM 251 and the CHDM 252, among other locations. Block 113 at the CDM 251 determines that verification rule "20" has been triggered based on the received current event data 521 as the particular username "alan_1" does not match the machine account "michaela$". In some embodiments this information can be determined from comparing the text strings of the username and the machine account name (e.g., "alan" does not match "michael"). In other embodiments, CDM 251 may search the enterprise content repository 140 to determine that the username is not associated with the machine account. In response, the CDM 251 then sends an activity context 520 to the DAVM 110. The activity context 520 may include the current event data 521, and may also include a rule identifier 535 identifying the rule ID of the verification rule that was triggered (e.g., "20"). As noted previously, the current event data is also received at the CHDM 252, and may be processed accordingly.

DAVM 110 receives activity context 520, and at block 118 the DAVM 110 selects the target role from a plurality of target roles based on the activity context. In this case, the activity context indicates that the rule ID is "20". Thus, the DAVM 110 follows the logic for rule ID "20" at block 118, and this logic causes the DAVM 110 to select as the target role the owner of the username (user credentials) that is specified in the activity context 520 and as a second target role the owner of the machine specified by the machine account in the activity context 520. In the illustrated example these target roles are the user that is owner of the user credentials "alan_1" and the owner of the machine with machine account "michaela$".

Subsequently, at block 119, the DAVM 110 selects the target users in the selected target roles based on the enterprise context. The DAVM 110 searches the proper enterprise context repository 140 (e.g., a directory services repository) and determines the user that is the owner of the user credentials specified from block 118. In the illustrated example, Alan 565a is the owner of the credentials "alan_1". The DAVM 110 also searches the proper enterprise context repository 140 and determines the user that is the owner of the machine with machine account specified from block 118. In the illustrated example, Michael 564a is the owner of the machine. Thus, the DAVM 110 selects the users Alan 565a and Michael 564a as the target users. DAVM 110 then sends verification request messages 558a and 559a to Alan 565a and Michael 564a on the appropriate contact channels. Alan 565a and Michael 564a may then respond with a verification response messages 558b and 559b. Responses are handled in similar manner as described above.

Figure 5H:
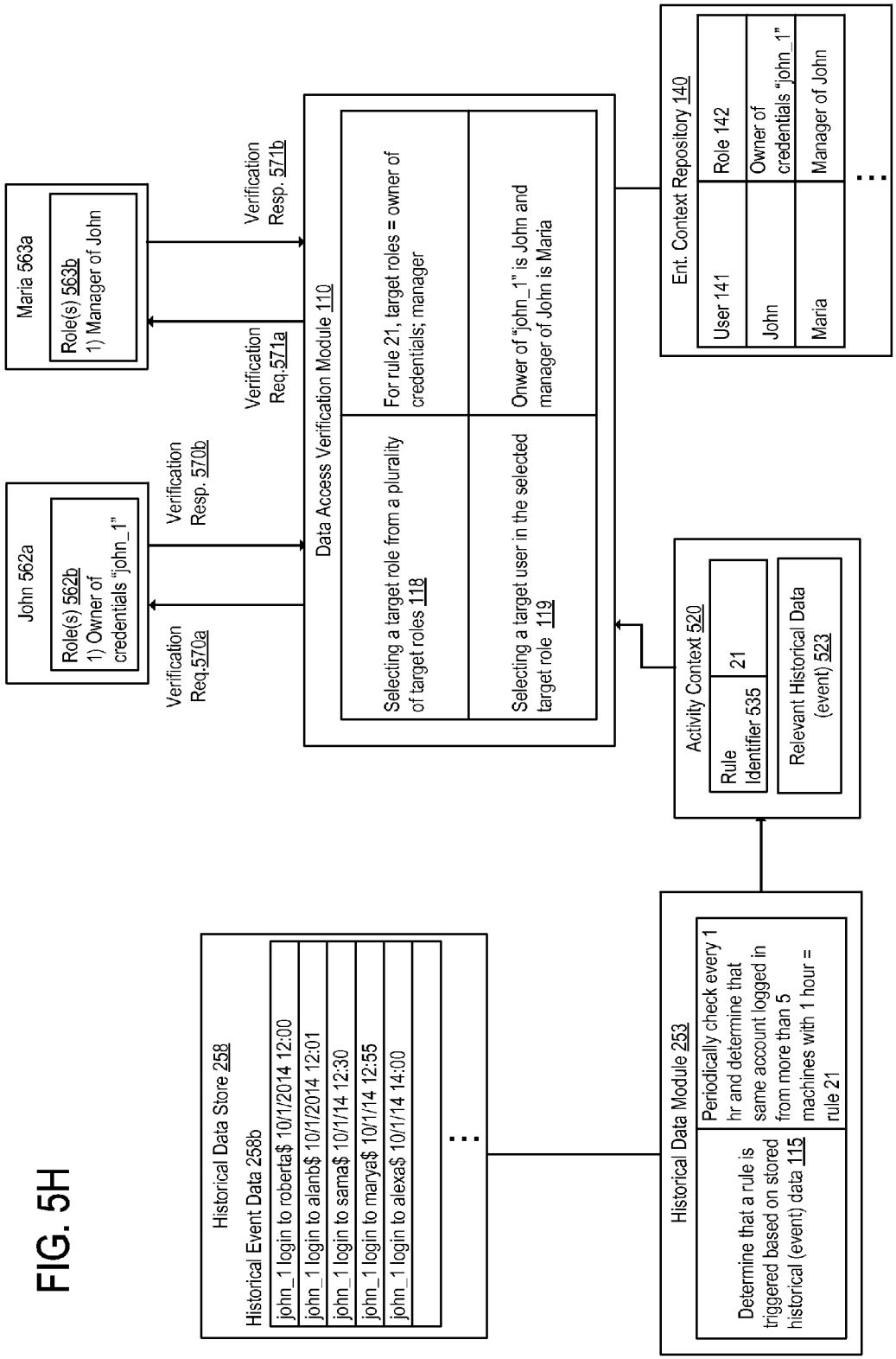
FIG. 5H illustrates an exemplary verification rule "21" triggered at the HDM 253 for one account logged in to more than five machines within an hour time period according to an embodiment of the invention.

FIG. 5H illustrates an exemplary verification rule "21" triggered at the HDM 253 for one account logged in to more than five machines within an hour time period according to an embodiment of the invention.

The illustrated exemplary verification rule "21" indicates that if historical data indicates that one user is logged into at least five different machines, then a verification request should be sent to the user and the user's manager. For this verification rule, the TCAM 102 is not used. Instead, the verification rule relies solely on historical data from the historical data store 258. As noted previously, the historical data store 258 may store event data related to previous verifications. Thus, the rule is triggered at the HDM 253 without the HDM 253 receiving any data from the TCAM 102 such as current event data. Instead, in this case, the HDM 253 may periodically check the historical data store 258 to determine if the rule has been triggered. In the illustrated example, the verification rule "21" is set to have the HDM 253 periodically check the historical data store 258 every hour to determine whether the rule has been triggered. In some embodiments, the frequency with which the HDM 253 checks the historical data store 258 may be different. Instead of or in addition to period check, some embodiments of the HDM 253 check the historical data store in response to a verification request being sent or a verification response being received. In such a case, the HDM 253 may receive an indicator or message from the DAVM 110 when a verification request is sent or a verification response is received. In other embodiments, the trigger to check the historical data store 258 is based on other factors, such as a manual triggering by an administrator.

At block 115, the HDM 253 determines that verification rule "21" has been triggered based on the historical data store 258 as the username "john_1" has logged into at least five machines within an hour. In response, the HDM 253 sends an activity context 520 to the DAVM 110. The activity context 520 may include a rule identifier 535 identifying the rule ID of the verification rule that was triggered (e.g., "21"). The activity context 520 may also include the relevant historical data 523 from the historical data store (e.g., the login events).

DAVM 110 receives activity context 520, and at block 118 the DAVM 110 selects the target role from a plurality of target roles based on the activity context. In this case, the activity context indicates that the rule ID is "21". Thus, the DAVM 110 follows the logic for rule ID "21" at block 118, and this logic causes the DAVM 110 to select as the target role the owner of the username (user credentials) that is specified in the activity context 520 and as a second target role the manager of that owner of the username. In the illustrated example these target roles are the user that is owner of the user credentials "john_1" and the manager of the user with the username "john_1".

Subsequently, at block 119, the DAVM 110 selects the target users in the selected target roles based on the enterprise context. The DAVM 110 searches the proper enterprise context repository 140 (e.g., a directory services repository) and determines the user that is the owner of the user credentials specified from block 118. In the illustrated example, John 562*a* is the owner of the credentials "john_1". The DAVM 110 also searches the proper enterprise context repository 140 and determines the manager of this user. In the illustrated example, Maria 563*a* is John's manager. Thus, the DAVM 110 selects the users John 562*a* and Maria 563*a* as the target users. DAVM 110 then sends verification request messages 570*a* and 571*a* to John 562*a* and Maria 563*a* on the appropriate contact channels. John 562*a* and Maria 563*a* may then respond with a verification response messages 570*b* and 571*b*. Responses are handled in similar manner as described above.

Figure 5I:
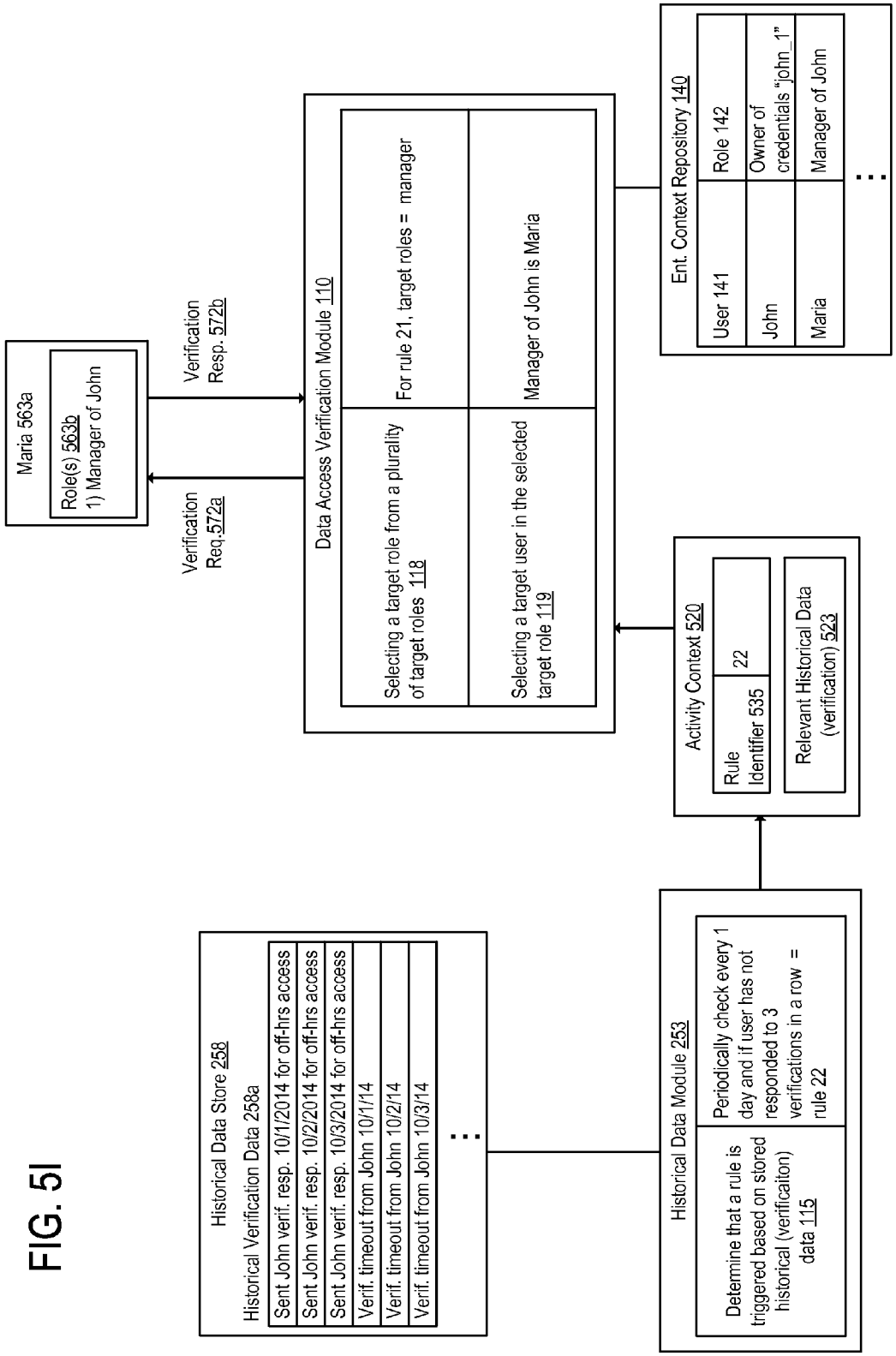
FIG. 5I illustrates an exemplary verification rule "22" triggered at the HDM 253 for a user who has not responded to three consecutive verification requests according to an embodiment of the invention.

FIG. 5I illustrates an exemplary verification rule "22" triggered at the HDM 253 for a user who has not responded to three consecutive verification requests according to an embodiment of the invention.

The illustrated exemplary verification rule "21" indicates that if historical data indicates that one user has not responded to three consecutive verification requests (i.e., the timed out), then a verification request should be sent to the user and the user's manager. Similar to the example in FIG. 5H, the verification rule relies solely on historical data from the historical data store 258 (the TCAM 102 is not used) and embodiments may perform the check of this responsive to the same variety of stimulus (e.g., periodic, verification responses/request, manually).

At block 115, the HDM 253 determines that verification rule "22" has been triggered based on the historical data store 258 as the user John has not responded to three consecutive verification requests. In response, the HDM 253 sends an activity context 520 to the DAVM 110. The activity context 520 may include a rule identifier 535 identifying the rule ID of the verification rule that was triggered (e.g., "22"). The activity context 520 may also include the relevant historical data 523 from the historical data store (e.g., the past verifications).

DAVM 110 receives activity context 520, and at block 118 the DAVM 110 selects the target role from a plurality of target roles based on the activity context. In this case, the activity context indicates that the rule ID is "22". Thus, the DAVM 110 follows the logic for rule ID "22" at block 118, and this logic causes the DAVM 110 to select as the target role the manager of the user specified in the activity context 520. In the illustrated example the target role is the manager of user John.

Subsequently, at block 119, the DAVM 110 selects the target user in the selected target role based on the enterprise context. The DAVM 110 searches the proper enterprise context repository 140 (e.g., a directory services repository) and determines the user that is the manager of the user specified from block 118. In the illustrated example, Maria 563*a* is the manager of the user John. DAVM 110 then sends verification request messages 572*a* to Maria 563*a* on the appropriate contact channel. Maria 563*a* may then respond with a verification response message 572*b*.

As noted previously, FIGS. 5A-5I illustrate examples of verification rules and how the system may operate regarding these verification rules. However, in other embodiments, the verification rules and operations related to these verification rules may be different.

FIG. 6 is a block and flow diagram illustrating various verification and alert methods according to an embodiment of the invention. After DAVM 110 has selected a target user(s) for verification in block 116, at block 120 DAVM 110 causes a verification request to be sent to the target user(s). In order to do this, in some embodiments, the DAVM 110 selects a verification type for the verification request (block 610). As previously describes, in some embodiments, the verification type may be positive or negative and the verification type may include a challenge.

Thus, at block 611, the DAVM 110 may select a positive or negative verification.

In some embodiments, whether the DAVM 110 selects a positive verification type or a negative verification type is dependent upon: 1) the activity context 105 (e.g, the DAVM 110 may be configured to select positive verification types for certain rule IDs that are triggered, and negative verification types for others—such as, if off-hours access is relatively frequent and not so abnormal for an enterprise, then a negative verification type may be used when a verification rule is triggered for off-hours access); and/or 2) the target user that was selected in block 116 (e.g., positive verification types may be configured for users who are independent contractors, and negative verification types for enterprise employees).

At block 613, an additional challenge may be added to the verification request if a compromised insider is suspected. A compromised insider is an enterprise user whose user credentials may be compromised by an attacker. The attacker may be able to use the compromised user's credentials to access and attack the enterprise resources 150. A compromised insider may be configured to be suspected based on the information in the activity context 105. For example, if a particular machine is used to initiate the attack, or if the user initiating the attack is a contractor (who may not have had full security training), then a challenge may be added to the verification request. As another example, if a verification rule is triggered based on access to restricted data in the enterprise, then a compromised insider may be suspected. The challenge method (CAPCHA, password challenge, hardware/software token, etc.) may be configured at the DAVM 110 to depend upon factors such as which verification rule was triggered, information in the activity context 105, the contact channel that is selected, and so on.

At block 614, the DAVM 110 sets a timeout value for the verification response based on the activity context. For example, some verification rules that are triggered may have a higher priority, and so a shorter timeout is set for those. As another example, if a manager is to be contacted for verification, a longer timeout period may be selected. In some embodiments, the timeout is also adjusted based upon the current time of day. For example, if the current time of day is during the middle of the work day, then a short two hour timeout may be selected.

After the verification type is selected and the timeout is set, the verification request message(s) are sent to the target user(s) on the appropriate contact channels. Additional details regarding contact channels will be described with reference to FIG. 9. Note that the details of the verification request message may change depending on the contact channel used. For example, if the contact channel is by phone, then a voice message is sent, but when the contact channel is text message, a shortened text-based message may be sent. Subsequently, the DAVM 110 may receive a verification response message(s) from the target user(s). The response message may take different forms. For example, the verification request message may include a uniform resource locator (URL) that the user may click on to respond to the verification. As another example, if a telephone is used for the verification request, then the user may be requested to press a number on the dial pad of his her phone to send the verification response. In other cases, no verification response message may be received and the verification may time out.

The user, in the verification request message, may not directly be presented with every detail regarding the network activity (e.g., IP addresses, timestamps, detailed packet and/or application message/event information) and may not be directly asked whether or not the activity is indicative of the possible insider threat. Instead, the verification request message may ask simpler questions that may effectively confirm whether or not the network activity is indicative of a possible insider threat. These questions may be easier for the user to understand, and they likely have the purpose of asking if the activity is or is not approved. For example, the verification request message may ask a user if he or she had used his or her enterprise machine during a time period where the network activity was detected. As another example, a verification request message may ask a user whether he or she had logged in to another user's computer, using the real name of the other user instead of a machine name. As another example, a manager may be asked whether one of his or her employees has been in the office or not recently. In this way, the user may not be overwhelmed with data that he or she cannot answer.

At block 121, as previously noted, DAVM 110 causes an alert when the verification result, which is based on the verification request and any verification response, indicates that the activity is indicative of a possible insider threat. In some embodiments, to perform the operation of block 121, DAVM 110 at block 620 determines the result of the verification. To do this, at block 621 DAVM 110 determines whether a verification response was received before the timeout. If a verification response was received, at block 623 the DAVM 110 determines whether the target user's response effectively indicates that the behavior or network activity is indicative of the possible insider threat. For example, if the user responds that he or she did use a computer off hours during the time period of the network activity, this may indicate that there is no insider threat. Alternatively, if the user indicates that he or she did not use any enterprise machine during that time period, this may indicate that an insider threat exists. If there is an indication of a possible insider threat, then an alert is sent at block 625. This alert will be described below. Otherwise control passes to block 624.

At block 621, if no verification response was received before the timeout, then at block 622 the DAVM 110 determines whether the target user's lack of response effectively indicates that the behavior or network activity is indicative of the possible insider threat. For example, if the verification type was a positive type, then a timeout would effectively indicate that the related network activity is not legitimate and indicates an insider threat. For block 621, if an insider threat is indicated, then at block 625 an alert is caused to be sent. Otherwise, control passes to block 624. At block 624, the verification result is stored in the historical data store 258. While in one embodiment all verification outcomes are stored in the historical data store 258, alternative embodiments may store a subset of verification outcomes.

If an alert is caused to be sent at block 625, then the DAVM 110 indicates to the alert handling module (AHM) 264 to send an alert. The AHM 264, at block 642, sends an alert to the system administer (or other designated person). This alert includes the activity context 105 related to the network activity that caused the alert, as well as the current verification data. The current verification data may include when the verification request that caused the alert was sent, what was sent in the verification request message, to whom the message was sent to, whether a response was received, whether a timeout occurred, and any other related data to the verification.

In some embodiments, AHM 264 increases the logging rate of the system at block 643 in response to sending the alert. This may be logging performed at the AHM 264 regarding alerts and/or may also be logging performed by the DAVM 110 (in which case the AHM 264 would send an indication to the DAVM 110 to instruct it to increase logging). In some embodiments the AHM 264 implements a quarantine or partial quarantine of any related traffic at block 644 in response to sending the alert. To accomplish this, the AHM 264 may send a message to the security gateway 320 in the system to request a quarantine of any traffic with certain characteristics (e.g., packet headers, application message data) matching certain criteria that are the same or similar to the network activity that caused the alert. In some embodiments the AHM 264 blocks the traffic related to the collected data at block 645 in response to sending the alert. This may also be accomplished by sending a message to the security gateway 320 to ask it to block the related traffic.

The AHM 264 sends an alert package 660 to the system administrator (e.g., Robert 631*a* illustrated as having role 631*b*). The alert package includes alert package data 661. This data may include the activity context and the current verification data. In some cases the alert package 660 may include an option for the system administrator to respond and request an action to be performed by the AHM 264, such as increasing logging, implementing a quarantine, or blocking traffic related to the possible insider threat.

Figure 7:
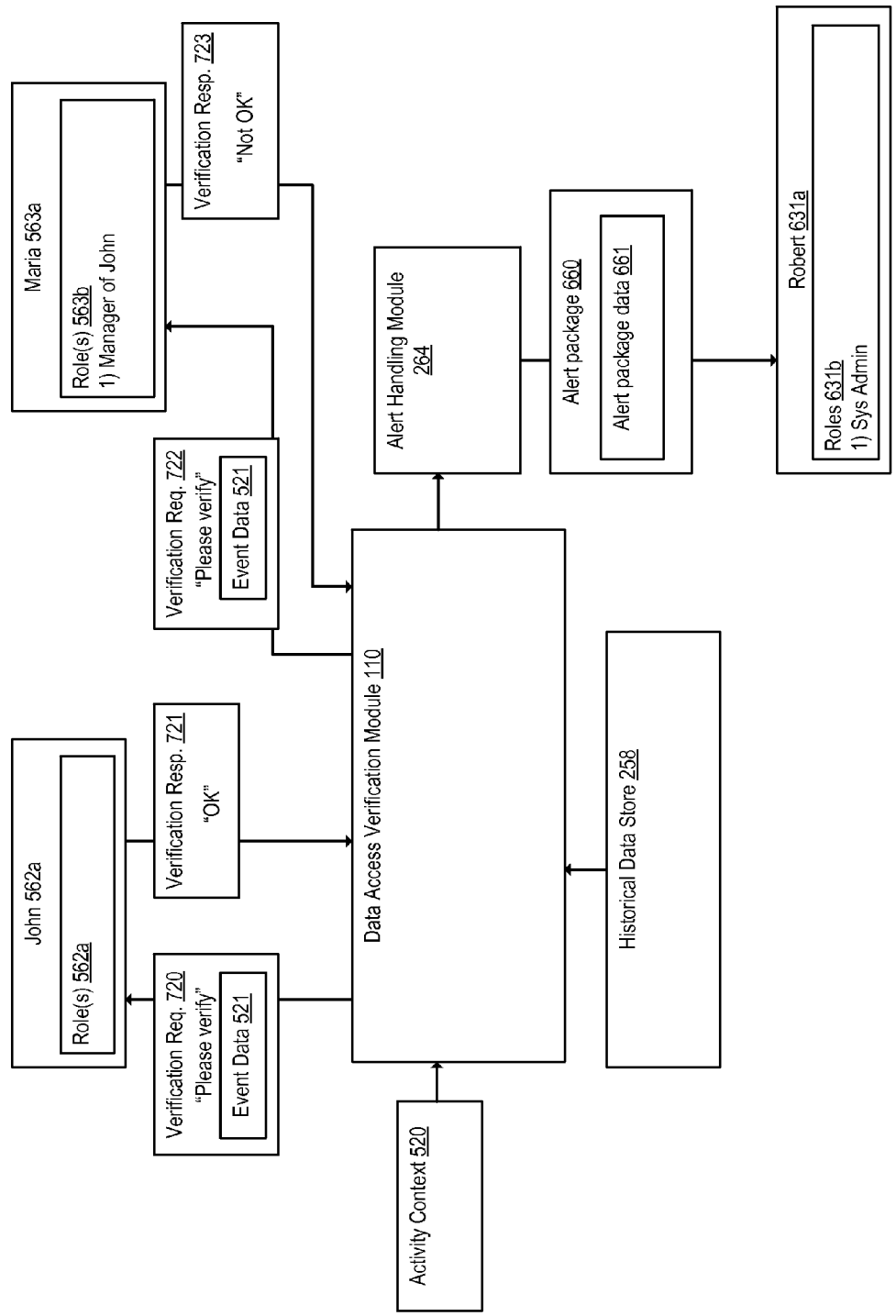
FIG. 7 is a block diagram illustrating an example of an alert being sent to a system administrator according to an embodiment of the invention.

FIG. 7 is a block diagram illustrating an example of an alert being sent to a system administrator according to an embodiment of the invention. DAVM 110 receives activity context 520 indicating a verification rule is triggered that requires verification with a user and his or her manager. DAVM 110 then determines the target roles and target users and sends a verification request 720 to John 562*a* on the appropriate channel along with event data 521 that includes information regarding the event specified in the activity context 520. Another verification request 722 is sent to Maria 563*a*, who is John's manager. John 562*a* sends a verification response 721 that effectively indicates that no insider threat exists. However, Maria 563*a* sends a verification response 723 that effectively indicates that there is a possible insider threat. As noted above, in such a case, flow at the DAVM 110 passes from block 623 to block 625 to cause an alert to be sent. The alert package 660 is then sent by the AHM 264 to Robert 631*a*, who is the system administrator.

Figure 8:
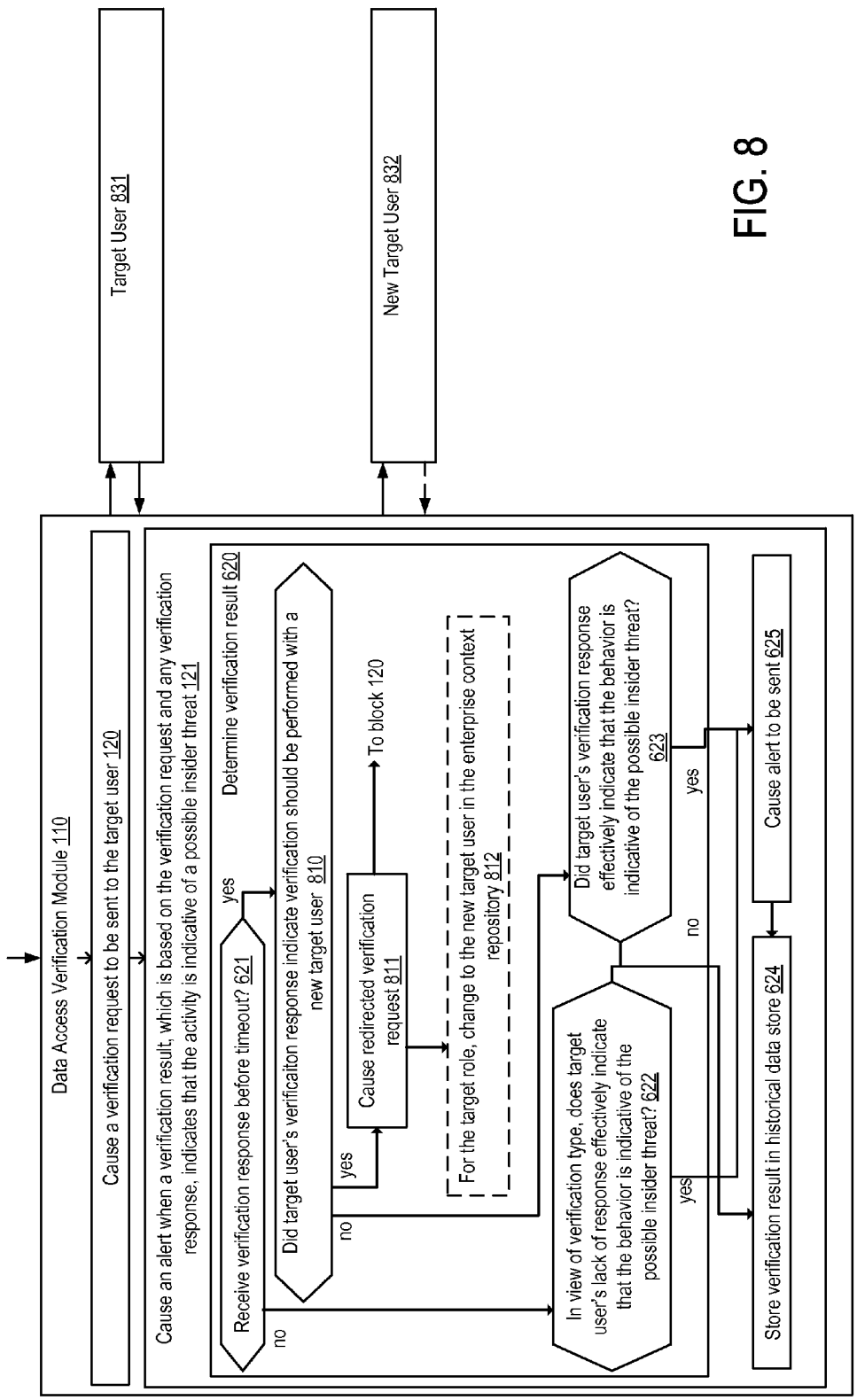
FIG. 8 is a block and flow diagram illustrating a method of verification redirection according to an embodiment of the invention.

FIG. 8 is a block and flow diagram illustrating a method of verification redirection according to an embodiment of the invention. In some situations, the target user selected by the DAVM 110 at block 116 may not have been the most knowledgeable user for the particular suspicious network activity and might not be able to effectively verify whether the activity is a possible insider threat. In such a case, that user may be provided an option to "redirect" the verification to a new target user in the verification request message. For example, the verification request message may have an option to verify the request, and also a separate option to select a new target user to redirect the request. Such a redirection method is described below.

For this redirection method, at block 620, the additional blocks 810, 811, and 812 are added. At block 621, a verification request is received by the DAVM 110 from target user 831. Flow thus proceeds to block 810, where the DAVM 110 determines whether the target user's verification response indicates that verification should be performed with a new target user 832. If a new target user is indicated, then at block 811, DAVM 110 causes a new redirected verification with the new target user 832 and flow proceeds to block 120 to perform the redirection with the new target user 832. In some embodiments, at block 812, the new target user 832 is associated with the target role selected in block 116 so that in future verifications where that target role is selected, the new target user is selected instead. If no redirection is indicated, then flow proceeds as normal to block 623.

Figure 9:
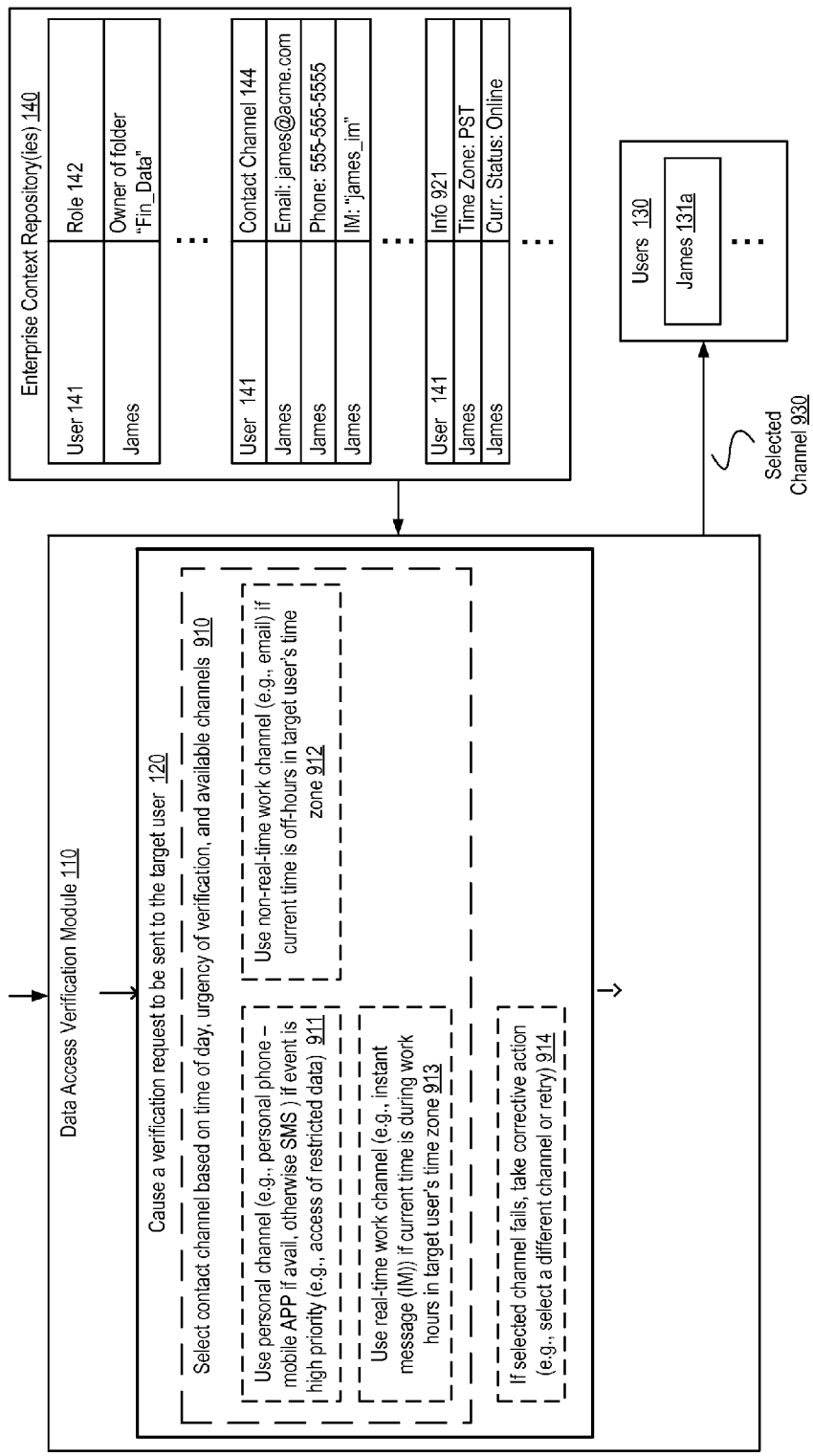
FIG. 9 is a block and flow diagram illustrating a method of channel selection according to an embodiment of the invention.

FIG. 9 is a block and flow diagram illustrating a method of channel selection according to an embodiment of the invention. When a verification request message is sent at block 120 by DAVM 110, it should be sent via the proper contact channel. If a user is not in the office, then it may be more efficient to send the verification to the user's phone, and so on. A method of selecting the contact channel to send the verification on is described herein.

At block 910, within block 120, the DAVM 110 selects the contact channel to send the verification request message on based on the time of day, urgency of the verification, and/or the available channels for the target user. The selection method for a contact channel to be used may be configured beforehand by an administrator and may be specific to the verification rule, target user, target role, or other aspect within the activity context 105.

At block 911, a personal channel may be selected in the event of a high priority verification (e.g., if restricted data is accessed). The personal channel may include a target user's phone, and may include a mobile application for this purpose on the target user's phone, a text message (SMS), or voice message.

At block 912, a non-real-time work channel, such as email, may be used if the current time is off-hours in the target user's time zone. The DAVM 110 may determine the time zone of the target user using the enterprise context repositories 140 (e.g., using info 921).

At block 913, a real-time work channel, such as instant messaging (IM), may be used if the current time is during work hours for the target user's time zone. It is assumed the user is logged into his or her enterprise IM application during this time.

While certain contact channels and selection methods are described here, in other embodiments other contact channels and selection methods may be used by the DAVM 110.

The user is then sent the verification message on the selected channel 930. At block 914, if the DAVM 110 determines that the selected contact channel fails, it may take corrective action, which may include retrying the contact channel or selecting a different contact channel Note that a failure of a contact channel here does not mean that the verification has timed out, but rather indicates that the particular contact channel is unavailable. For example, an email contact channel may fail if an undeliverable message is received after the email is sent. A text message contact channel may fail if an error message is received. An IM contact channel may fail if the target user is offline. When a contact channel fails, DAVM 110 may additionally note this information in the enterprise context repository 140 so that for future verifications DAVM 110 may select the correct contact channel on the initial attempt.

Note that the format of the verification request message and the verification response messages is different depending on the type of contact channel used. For example, a text message may include a condensed version of a verification message, while an IM may include a more interactive version of a verification message. Such differences may be preconfigured within the DAVM 110.

Figure 10:
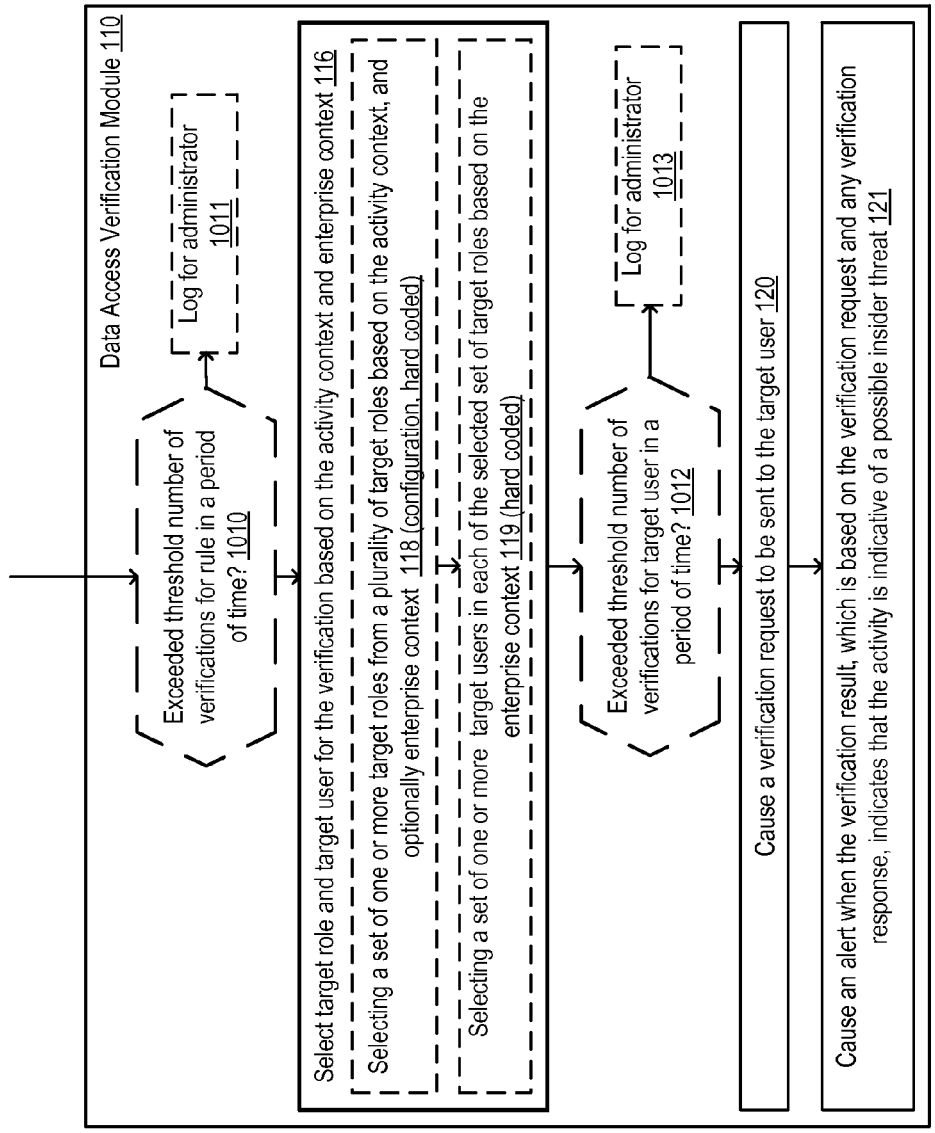
FIG. 10 is a block and flow diagram illustrating methods of capping the number of verifications sent according to an embodiment of the invention.

FIG. 10 is a block and flow diagram illustrating methods of capping the number of verifications sent according to an embodiment of the invention. In some cases a user may have been sent a large number of verifications over a short period of time, and the DAVM 110 may take alternative action, such as logging for the system administrator, in order to avoid verification request becoming too common place to be taken seriously. In other cases a verification rule may have been triggered a large number of times over a short period of time, the DAVM 110 may take alternative action, such as logging the incident for the system administrator, because the verification rule may need adjustment. The actions that the DAVM 110 may take will be described below.

At block 1010, prior to selecting a target role and target user at block 116, the DAVM 110 may determine whether the particular verification rule indicated in the received activity context 105 has been triggered more than a (predetermined) threshold number of times within a (predetermined) threshold period of time (e.g., more than 10 times within 1 hour). If the threshold is exceeded, DAVM 110 may then perform an action, such as log the incident for an administrator at block 1011. The DAVM 110 may also cause an alert to be sent to the administrator. In this case, a verification request may not be sent.

At block 1012 after the target user is selected at block 116, the DAVM 110 may determine whether the particular target user that was selected has had more than a (predetermined) threshold number of verifications sent to that user within a (predetermined) threshold period of time. The information regarding past verifications may be found in the historical data store 258. If the threshold is exceeded, DAVM 110 may then perform an action, such as log the incident for an administrator at block 1013. The DAVM 110 may also cause an alert to be sent to the administrator. In this case, a verification request may not be sent.

FIGS. 11A-11D illustrate exemplary deployment environments for the system described herein according to certain embodiments of the invention. While FIGS. 11a-11d depict certain deployment scenarios, including deployment scenarios that include the cloud, in other embodiments the system is deployed using different deployment scenarios.

Figure 11A:
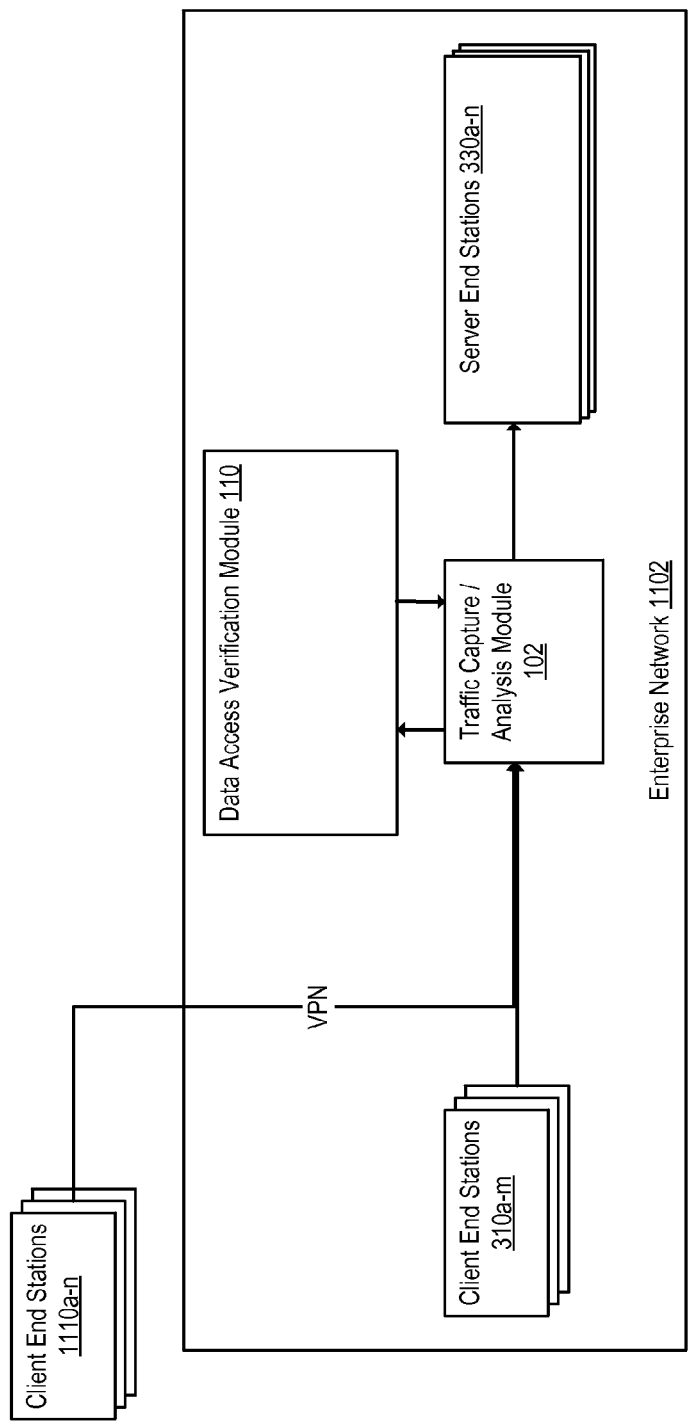
FIG. 11A illustrates an exemplary deployment scenario where the DAVM 110, the TCAM 102, and the server end stations 330a-n are within the enterprise network 1102, and client end stations may be connecting to the server end stations 330a-n from inside the enterprise network 1102 or from outside through a VPN.

FIG. 11A illustrates an exemplary deployment scenario where the DAVM 110, the TCAM 102, and the server end stations 330a-n are within the enterprise network 1102, and client end stations may be connecting to the server end stations 330a-n from inside the enterprise network 1102 or from outside through a VPN. Although the client end stations 1110 are not physically part of the enterprise network 1102 (e.g., within the same LAN), by connecting via a VPN, they can establish a virtual connection that enables them to be part of the enterprise network 1102. This scenario may arise for users connecting to the enterprise network from their home offices or while they are on the road.

Figure 11B:
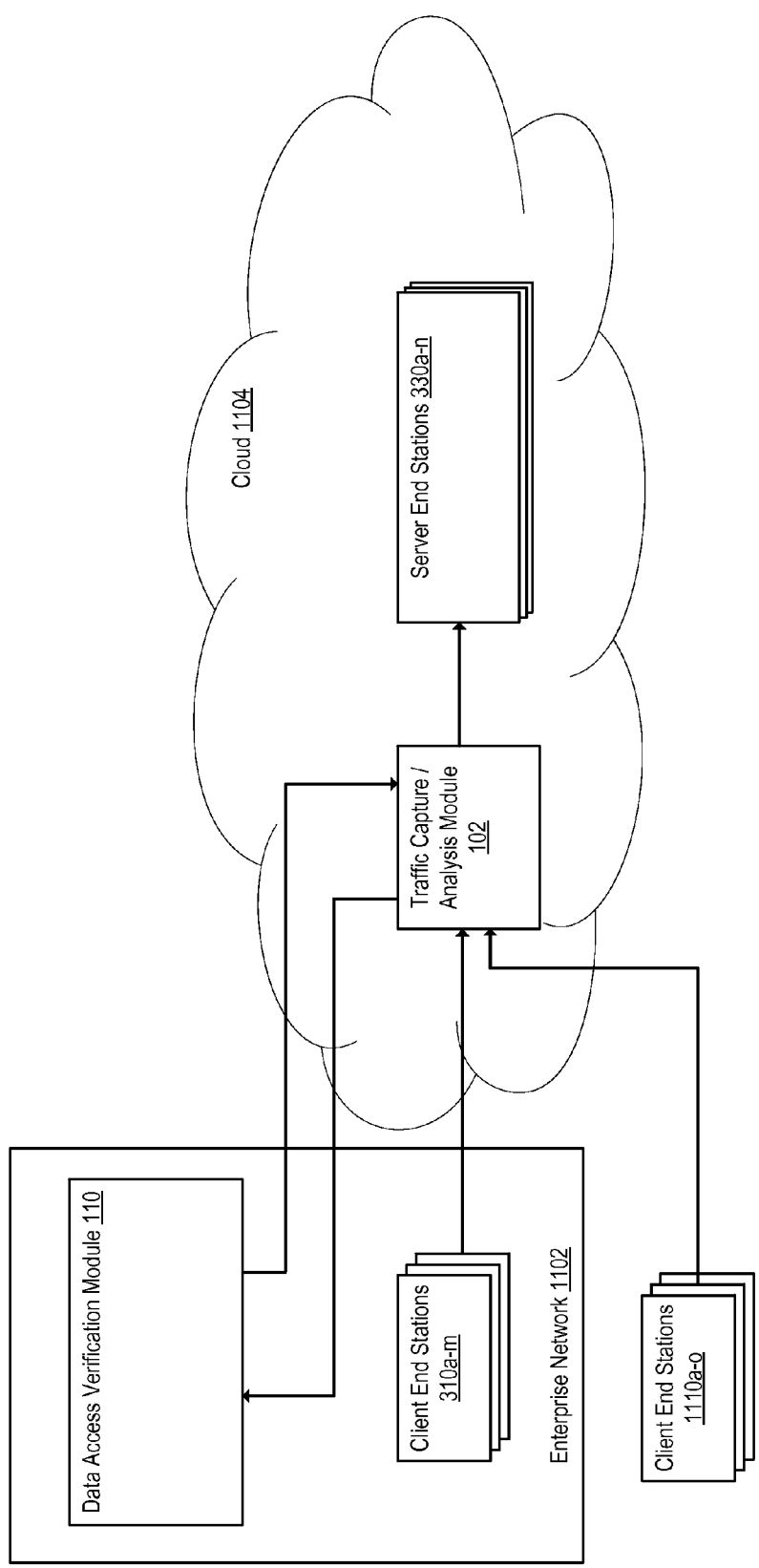
FIG. 11B illustrates an exemplary deployment scenario where the DAVM 110 is within the enterprise network 1102, but where the TCAM 102 and the server end stations 330 are within the cloud 1104, and client end stations may be connecting to the server end stations 330a-n from inside the enterprise network 1102 or from outside.

FIG. 11B illustrates an exemplary deployment scenario the DAVM 110 is within the enterprise network 1102, but where the TCAM 102 and the server end stations 330 are within the cloud 1104, and client end stations may be connecting to the server end stations 330a-n from inside the enterprise network 1102 or from outside. Such a scenario may be used where the enterprise has its enterprise applications and data hosted by a cloud provider. The TCAM 102 may be placed in the cloud in such a scenario so that it may intercept both traffic coming from the enterprise network 1102 and from outside the enterprise network 1102.

Figure 11C:
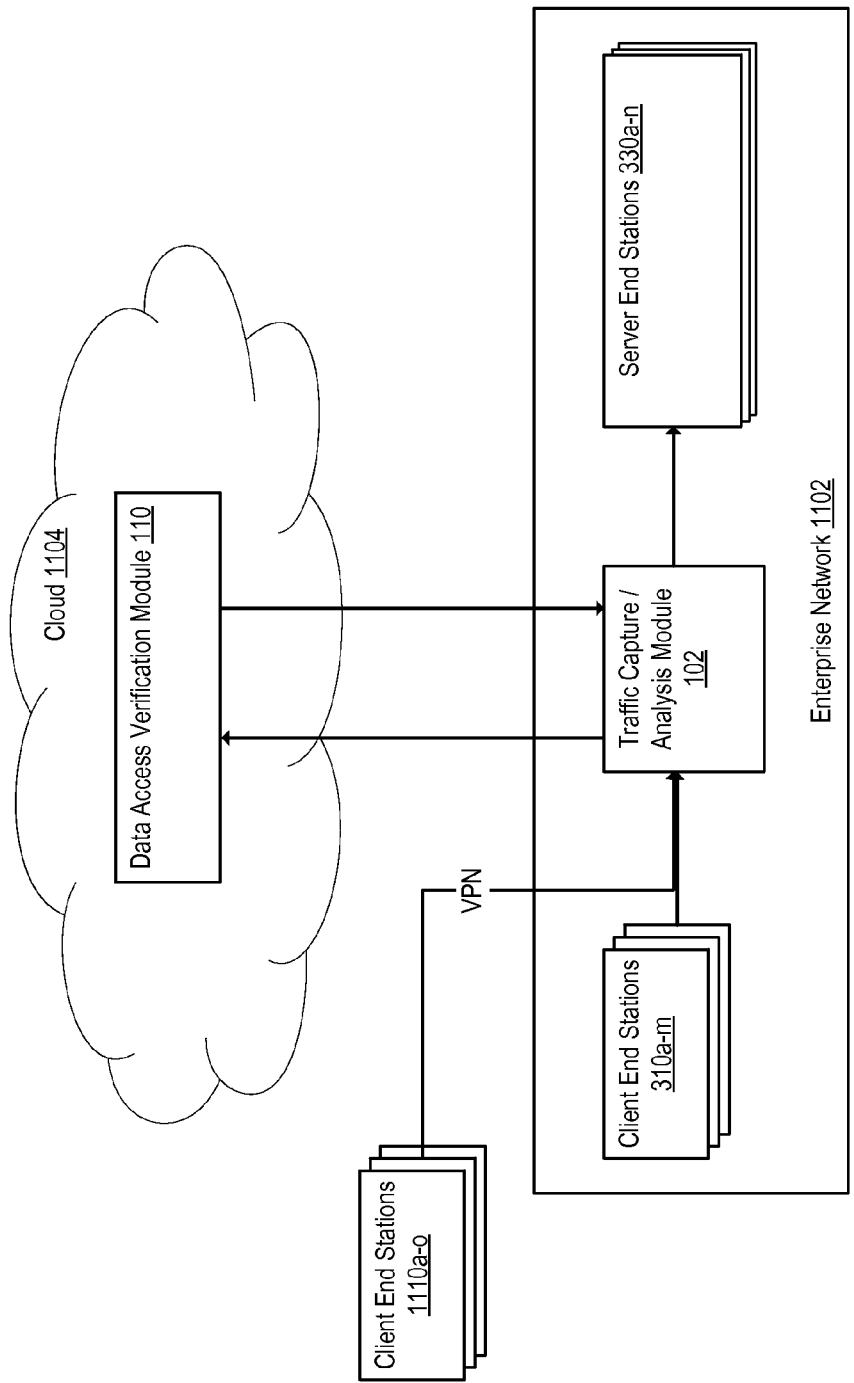
FIG. 11C illustrates an exemplary deployment scenario similar to that of FIG. 11A, however the DAVM 110 is in the cloud 1104.

FIG. 11C illustrates an exemplary deployment scenario similar to that of FIG. 11A, however the DAVM 110 is in the cloud 1104. This scenario may be beneficial in that the enterprise does not need to maintain the data access verification security system. Instead, a cloud provider may be able to provide that service, and may be able to simultaneously provide the service for multiple enterprises.

Figure 11D:
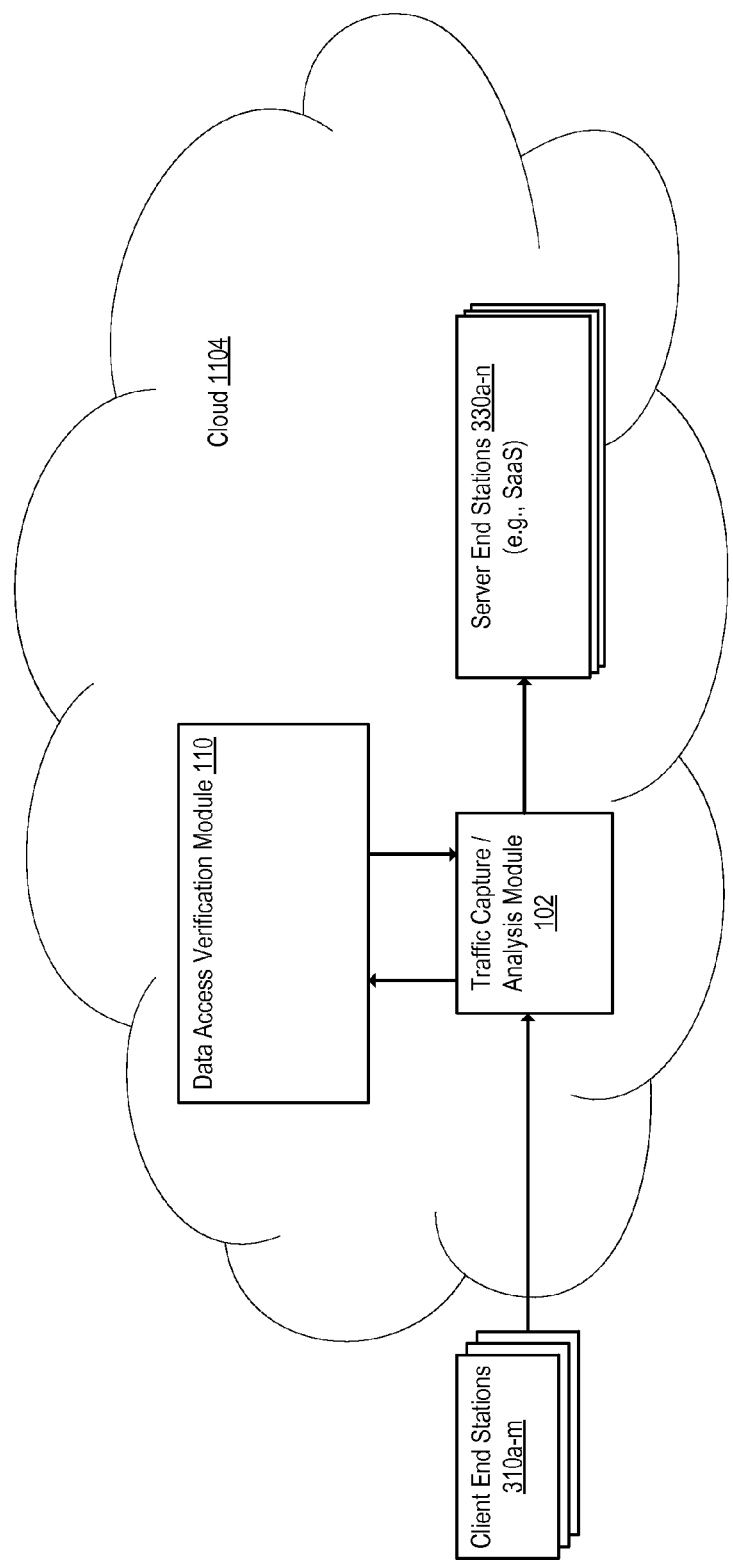
FIG. 11D illustrates an exemplary deployment scenario where the TCAM 102, server end stations 330, and DAVM 110 are all in the cloud 1104.

FIG. 11D illustrates an exemplary deployment scenario where the TCAM 102, server end stations 330, and DAVM 110 are all in the cloud 1104. This scenario may occur when the enterprise has almost its entire infrastructure in the cloud and may only have client end stations 310 as physical machines on its enterprise network. This allows the enterprise to be very lean in terms of IT costs. All requests to the enterprise resources on the server end stations 330 in this scenario still pass through TCAM, and the DAVM 110 verifies with the users of the client end stations 310.

Alternative Embodiments

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A non-transitory computer-readable storage medium having instructions stored therein, wherein the instructions, when executed by a processor of a computing device, cause the computing device to perform operations responsive to a determination that a verification with a user is desired responsive to detection of activity indicative of a possible insider threat, wherein the computing device is to be communicatively coupled to a traffic capture and analysis module (TCAM), wherein the TCAM is to be coupled between a set of one or more client end stations and a set of one or more server end stations to analyze network traffic being sent between them, wherein the set of server end stations is to store enterprise resources including an enterprise application and enterprise data, wherein the possible insider threat comprises the use of one or more of a user account and a client end station to access the enterprise resources, and wherein the determination that the verification with the user is desired was based on one or more of the network traffic, current event data, and stored historical data, wherein the current event data describes an access to one of the enterprise resources that was detected and reported on by the TCAM, the operations comprising:

determining whether a number of detections of activity indicative of the possible insider threat caused by a rule exceeds a predetermined threshold within a predetermined period of time;

when the number of detections of activity indicative of the possible insider threat caused by the rule exceeds the predetermined threshold within the predetermined period of time, notifying an administrator and forgoing the verification;

otherwise, performing the following, selecting a target role and a target user for the verification based on an activity context and an enterprise context repository, wherein the activity context describes the activity by identifying the rule used to make the determination and by identifying one or more of the current event data and relevant historical data, wherein the enterprise context repository identifies roles within the enterprise and the users in those roles, the selecting including:

selecting the target role from a plurality of target roles based on the activity context, wherein the plurality of target roles includes two or more of an owner of the client end station, an owner of the user account, an owner of a particular part of the enterprise data, and a position at the enterprise;

selecting the target user in the selected target role based on the enterprise context repository, wherein the selected target role and the selected target user in that selected target role is intended to be the user of the enterprise having the requisite knowledge to confirm whether or not the activity is indicative of the possible insider threat, wherein the selected target user is a different individual than the owner of the user account and the administrator;

determining whether a number of verifications with the target user exceeds another predetermined threshold within another predetermined period of time;

when the number of verifications with the target user exceeds the another predetermined threshold within the another predetermined period of time, notifying the administrator and forgoing the verification;

otherwise, performing the following, causing a verification request to be sent to the selected target user, wherein the verification request describes the activity and allows the selected target user to effectively confirm whether or not the activity is indicative of the possible insider threat; and generating an alert when a verification result, which is based on the verification request and any verification response, indicates that the activity is indicative of the possible insider threat.

2. The non-transitory computer-readable storage medium of claim 1, wherein the selected target role is a manager of the owner of the user account or the owner of the client end station.

3. The non-transitory computer-readable storage medium of claim 1, wherein the selected target role is the owner of the particular part of the enterprise data that is the subject of the activity.

4. The non-transitory computer-readable storage medium of claim 1, wherein the selected target role is the owner of the client end station.

5. The non-transitory computer-readable storage medium of claim 1, wherein the alert comprises notifying the administrator of the enterprise about the activity.

6. The non-transitory computer-readable storage medium of claim 1, wherein the alert comprises causing the TCAM to block network traffic from a source.

7. The non-transitory computer-readable storage medium of claim 1, wherein the operations further comprise:

selecting a channel of communication for the verification request based on two or more of a set of one or more available channels of communication, time of day for the target user, and urgency that stems from the activity, wherein the verification request is sent via the selected channel of communication.

8. The non-transitory computer-readable storage medium of claim 1, wherein the operations further comprise:

receiving a verification response from the target user identifying a new target user and indicating that the verification should be performed with the new target user; and causing a second verification request to be sent to the new target user.

9. The non-transitory computer-readable storage medium of claim 8, wherein the operations further comprise:

recording in the enterprise context repository that similar future verifications should be with the new target user instead.

10. The non-transitory computer-readable storage medium of claim 1, wherein the operations further comprise:

selecting a type for the verification request from a plurality of types based on one or more of the activity and configuration data, wherein the plurality of types include a positive type and a negative type.

11. The non-transitory computer-readable storage medium of claim 1, wherein the selected target user is a manager of the user as part of an escalation plan.

12. The non-transitory computer-readable storage medium of claim 1, wherein the verification request is caused to be sent out-of band relative to the network traffic.

13. The non-transitory computer-readable storage medium of claim 1, wherein the insider threat is one of a compromised insider threat, a malicious insider threat, and a negligent insider threat.

14. The non-transitory computer-readable storage medium of claim 1, wherein the stored historical data reflects one or more of a set of prior verification requests sent to users and any corresponding verification responses from those users and a set of prior event data that describes accesses to one of the enterprise resources that was detected and reported on by the TCAM.

15. The non-transitory computer-readable storage medium of claim 1, wherein the verification request, instead of directly asking whether or not the activity is indicative of the possible insider threat, poses one or more questions that are expected to be more understandable to the selected target user.

16. A computing device configured to respond to a determination that a verification with a user is desired responsive to detection of activity indicative of a possible insider threat, wherein the computing device is to be communicatively coupled to a traffic capture and analysis module (TCAM), wherein the TCAM is to be coupled between a set of one or more client end stations and a set of one or more server end stations to analyze network traffic being sent between them, wherein the set of server end stations to store enterprise resources including an enterprise application and enterprise data, wherein the possible insider threat comprises the use of one or more of a user account and a client end station to access the enterprise resources, and wherein the determination that the verification with the user is desired is based on one or more of the network traffic, current event data, and stored historical data, wherein the current event data describes an access to one of the enterprise resources that was detected and reported on by the TCAM, the computing device comprising:

a processor and a memory, said memory containing instructions which when executed by the processor cause the computing device to:

determine whether a number of detections of activity indicative of the possible insider threat caused by a rule exceeds a predetermined threshold within a predetermined period of time;

when the number of detections of activity indicative of the possible insider threat caused by the rule exceeds the predetermined threshold within the predetermined period of time, notify an administrator and forgo the subsequent verification; otherwise, perform the following, select a target role and a target user for the verification based on an activity context and an enterprise context repository, wherein the activity context describes the activity by identifying the rule used to make the determination and by identifying one or more of the current event data and relevant historical data, wherein the enterprise context repository identifies roles within the enterprise and the users in those roles, the selection including to:

select the target role from a plurality of target roles based on the activity context, wherein the plurality of target roles includes two or more of an owner of the client end station, an owner of the user account, an owner of a particular part of the enterprise data, and a position at the enterprise; and select the target user in the selected target role based on the enterprise context repository, wherein the selected target role and the selected target user in that selected target role is intended to be the user of the enterprise having the requisite knowledge to confirm whether or not the activity is indicative of the possible insider threat, wherein the selected target user is a different individual than the owner of the user account and the administrator; determine whether a number of verifications with the target user exceeds another predetermined threshold within another predetermined period of time; when the number of verifications with the target user exceeds the another predetermined threshold within the another predetermined period of time, notify the administrator and forging the verification; and otherwise, perform the following, cause a verification request to be sent to the selected target user, wherein the verification request describes the activity and allows the selected target user to effectively confirm whether or not the activity is indicative of the possible insider threat; and generate an alert when a verification result, which is based on the verification request and any verification response, indicates that the activity is indicative of the possible insider threat.

17. The computing device of claim 16, wherein the selected target role is a manager of the owner of the user account or the owner of the client end station.

18. The computing device of claim 16, wherein the selected target role is the owner of the particular part of the enterprise data that is the subject of the activity.

19. The computing device of claim 16, wherein the selected target role is the owner of the client end station.

20. The computing device of claim 16, wherein the alert is to notify the administrator of the enterprise about the activity.

21. The computing device of claim 16, wherein the alert is to cause the TCAM to block network traffic from a source.

22. The computing device of claim 16, wherein the instructions when executed by the processor also cause the computing device to:

select a channel of communication for the verification request based on two or more of a set of one or more available channels of communication, time of day for the target user, and urgency that stems from the activity, wherein the verification request is sent via the selected channel of communication.

23. The computing device of claim 16, wherein the instructions when executed by the processor also cause the computing device to:

receive a verification response from the target user identifying a new target user and indicating that the verification should be performed with the new target user; and cause a second verification request to be sent to the new target user.

24. The computing device of claim 23, wherein the instructions when executed by the processor also cause the computing device to:

record in the enterprise context repository that similar future verifications should be with the new target user instead.

25. The computing device of claim 16, wherein the instructions when executed by the processor also cause the computing device to:

select a type for the verification request from a plurality of types based on one or more of the activity and configuration data, wherein the plurality of types include a positive type and a negative type.

26. The computing device of claim 16, wherein the selected target user is a manager of the user as part of an escalation plan.

27. The computing device of claim 16, wherein the verification request is caused to be sent out-of band relative to the network traffic.

28. The computing device of claim 16, wherein the insider threat is one of a compromised insider threat, a malicious insider threat, and a negligent insider threat.

29. The computing device of claim 16, wherein the stored historical data reflects one or more of a set of prior verification requests sent to users and any corresponding verification responses from those users and a set of prior event data that describes accesses to one of the enterprise resources that was detected and reported on by the TCAM.

30. The computing device of claim 16, wherein the verification request, instead of directly asking whether or not the activity is indicative of the possible insider threat, poses one or more questions that are expected to be more understandable to the selected target user.

* * * * *